(12) United States Patent
Willis et al.

(10) Patent No.: US 7,344,338 B2
(45) Date of Patent: Mar. 18, 2008

(54) PIPELINE BALLAST AND METHOD OF USE

(75) Inventors: Bradley C. Willis, Calgary (CA); W. Brent Willis, Calgary (CA); H. Craig Willis, Calgary (CA)

(73) Assignee: Blackfire Exploration Ltd., Calgary, Alberta (CA)

( * ) Notice: Subject to any disclaimer, the term of this patent is extended or adjusted under 35 U.S.C. 154(b) by 148 days.

(21) Appl. No.: 11/164,446

(22) Filed: Nov. 22, 2005

(65) Prior Publication Data

US 2006/0198705 A1 Sep. 7, 2006

(30) Foreign Application Priority Data

Nov. 22, 2004 (CA) .................................. 2488145

(51) Int. Cl.
*F16L 1/06* (2006.01)

(52) U.S. Cl. ..................................... 405/172; 405/184.4

(58) Field of Classification Search ................ 405/172, 405/184.4
See application file for complete search history.

(56) References Cited

U.S. PATENT DOCUMENTS

| 3,779,027 | A | * | 12/1973 | Murphy | 405/172 |
| 3,793,845 | A | * | 2/1974 | Keith | 405/172 |
| 3,993,192 | A | | 11/1976 | Bunn | |
| 4,477,206 | A | * | 10/1984 | Papetti et al. | 405/172 |
| 5,385,430 | A | * | 1/1995 | Connors | 405/172 |
| 5,443,329 | A | * | 8/1995 | de Geeter | 405/172 |
| 6,086,056 | A | * | 7/2000 | Leask et al. | 261/120 |
| 6,220,788 | B1 | * | 4/2001 | Jewell | 405/172 |
| 6,439,808 | B1 | * | 8/2002 | Smidt et al. | 405/172 |

FOREIGN PATENT DOCUMENTS

| CA | 1021952 | 12/1977 |
| CA | 2075006 | 7/1992 |
| CA | 2179969 | 12/1997 |
| CA | 2158801 | 7/1998 |
| CA | 2277523 | 2/2004 |
| CA | 2267969 | 6/2006 |
| SU | 638793 | 12/1978 |
| SU | 1675610 | 9/1991 |

OTHER PUBLICATIONS

Economical, Effective Pipeline Weights; http://pipesak.com/products.htm; accessed Feb. 13, 2004.

* cited by examiner

*Primary Examiner*—Frederick L. Lagman
(74) *Attorney, Agent, or Firm*—Sean W Goodwin

(57) ABSTRACT

A pipeline ballast has at least two sacks adapted to straddle a pipeline. Permeable sacks filled with inert high density aggregate such as barite uses less dry weight of aggregate to restrain buoyancy. Preferably a top sack and two pairs of side sacks connected to either side of the top sack, which when cinched, conform to the pipeline. Preferably each side sack is a pair of sacks which are flexibly hinged for more efficient loading onto the pipeline and for better conforming to the pipeline when cinched. Preferably a one piece cinching strap has two loops spaced thereon hook and loop type fasteners at the loose ends for securing together once cinched. The cinching strap is wrapped about the pipeline ballast and the lifting loops are positioned low on either side of the pipeline and lifted tangentially away from each other before the loose ends of the strap are secured to each other.

24 Claims, 18 Drawing Sheets

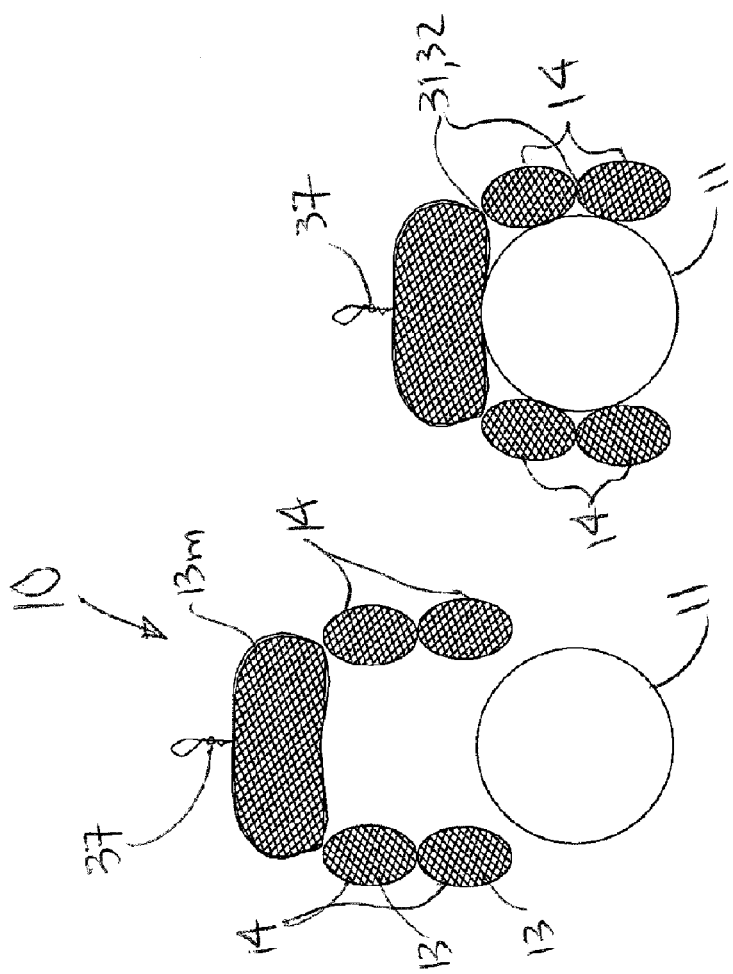
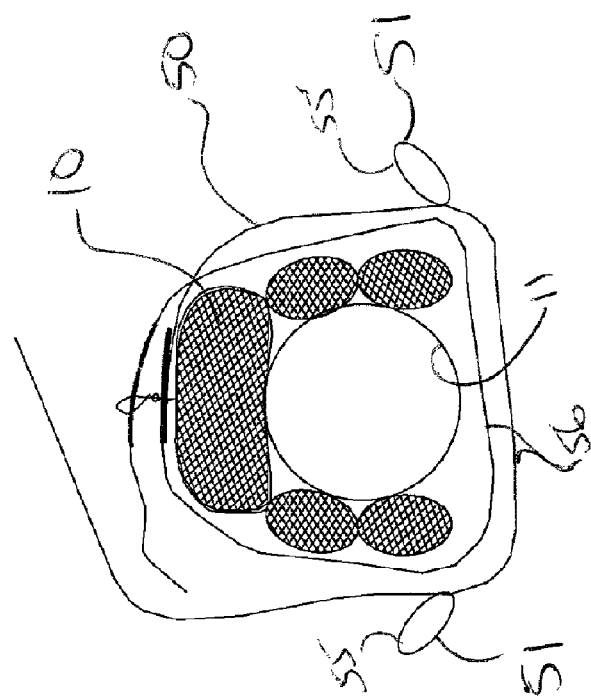
Fig. 9A   Fig. 9B   Fig. 9C

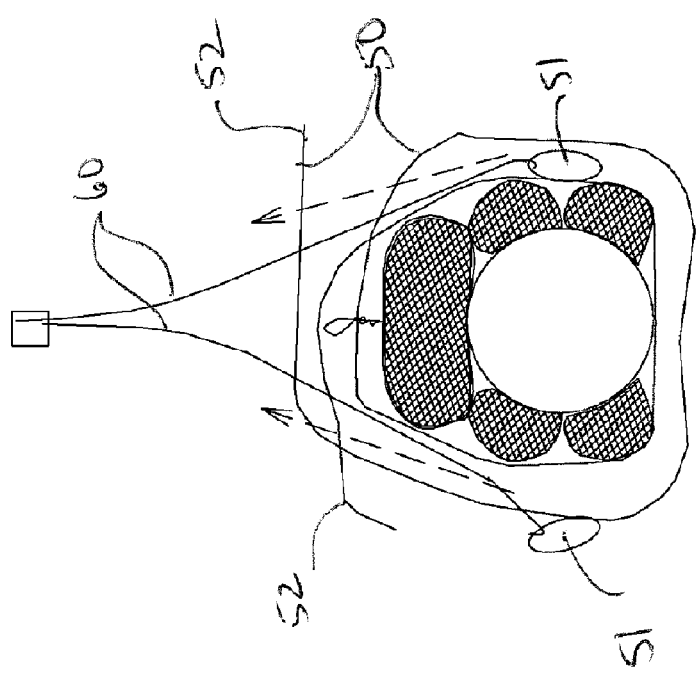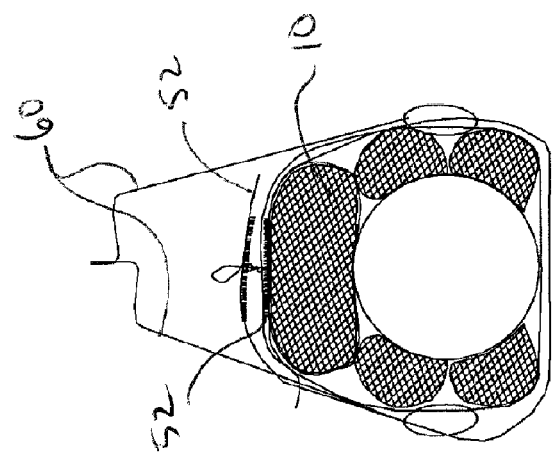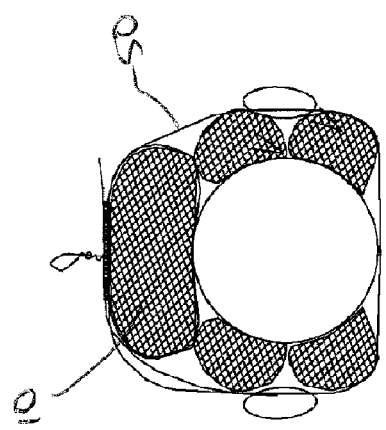
*Fig. 9D*  *Fig. 9E*  *Fig. 9F*

PIPELINE BALLAST AND METHOD OF USE

FIELD OF THE INVENTION

Embodiments of the invention relate to a system and method of installation of ballast to pipelines and more particularly to high density ballast material, arrangement of sacks and strapping systems.

BACKGROUND OF THE INVENTION

Pipelines are typically installed in subterranean trenches although even in-ground trenches can extend through geographical areas having little or no foundational support. Pipelines, particularly those carrying gaseous products can become buoyant in environments such as marshy areas and when under water. Hydrostatic forces and resulting movement of pipelines can cause stress and fatigue which can lead to catastrophic failure.

Typically in cold areas of the world pipelines are installed in winter when such unconsolidated environments are frozen. A trench is formed and the installed pipelines are weighted down with ballast of some sort including concrete and clamp-on weights. Once the environment thaws, the pipeline and weights become subject to hydrostatic forces and the intent is that the pipeline is restrained by the weights.

Most recently ballast is provided in a variety of sacks which avoid damage to a pipeline's protective coatings. Examples of such technology include Canadian Patent 2,277,523 by Jewell implementing a particular strapping embodiment and Canadian Patent 2,076,006 to Connors introducing particular forms of pipeline ballasts using ballast sacks.

Use of sacks, while safer for coated pipelines, are bulky and difficult to secure to the pipeline. Conventional sacks are filled with gravel or sand. The specific gravity of gravel or sand, while substantial, still requires a great volume for providing sufficient ballast. Connors deals with the strength and forces on the sacks with strengthening means and reinforcement means to restrict deformation and control the shape of the sack about the pipeline. Jewell has addressed some difficulties in properly securing gravel-filled sacks to the pipeline to minimize shifting.

Smaller pipelines can be installed into the trench with ballast already on them. The majority of pipeline ballast is strapped to the smaller pipelines before entering the ditch or trench. The weights are loaded on the pipeline and as the pipeline enters the trench on a steep angle the weights could slide down the pipeline and out of position in these conditions.

There is the possibility for shifting of the ballast along or off of the pipeline due to a variety of scenarios including: inadequate securing of the ballast thereto, frost heave, and possibly due to changes the buoyancy of the pipeline Larger pipelines are typically placed in the trench and ballast added after the fact. The underside of the installed pipeline is then virtually inaccessible which complicates conventional strapping means for securing of ballast.

Further, the sheer bulk of gravel compounds the aforementioned securing difficulties and adds to the time and expense for large excavations to accommodate the gravel ballast, the expense of a multiplicity of virtually continuous side-by-side placement along a pipeline, the labor expense to install so many sacks and high shipping cost to transport so many sacks to the installation point. Further, current sacks require the trench to be dug wide and deep due to the bulk of the sacks and as large sacks over hang below the bottom level of the pipeline.

Thus there continues to be a need for pipeline weights or ballast which resists shifting during hydrostatic, frost heave, steep incline installation conditions and other adverse conditions. The ballast is preferably readily and consistently secured to large diameter pipeline and the configuration of the pipeline ballast minimizes preparation and installation expense.

SUMMARY OF THE INVENTION

A pipeline ballast of ballast is now available which can be secured to the pipeline and will not move in any direction due to hydraulic, frost heave or other effects which can cause gradual movement. The weight can be used in water or swamp conditions as well when the freeze thaw cycle is not present. River and ocean crossings are also applicable. In one embodiment, high density and inert ballast is used to advantage in a pipeline ballast having at least two sacks. The high density ballast results in multiplication of the savings in restraining buoyancy, enabling a lighter initial dry weight of ballast and much smaller volumes that compared with the sand or gravel fill. Trench width is significantly reduced with savings in labor and time. Use of barite avoids leaching of heavy metals associated with other high density materials. In another embodiment, a pipeline ballast is provided using a top ballast sack and having two side sacks to either side of the top, middle sack and hang down on each side of the pipeline. When cinched, the side sacks conform to the pipeline. Preferably each side sack is a pair of sacks which are flexibly hinged for more efficient loading onto the pipeline and for better conforming to the pipeline when cinched. In yet another embodiment, an improved strapping system is employed to secure peripheral materials to cylindrical base structures such as pipeline ballast to pipelines. In one instance, a continuous, one piece cinching strap is provided which has two tightening or lifting loops and hook and loop type fasteners at the loose ends for securing together once cinched. The cinching strap is wrapped about the pipeline ballast and the lifting loops are positioned one on either side of pipeline, preferably positioned adjacent the bottom of the sack where maximum load can be taken and the majority of tension will be on bottom of pipe to ensure maximum tightening. The system can be accomplished without metal components which eliminates corrosions and risk of sack breakdown.

Thus, in one broad aspect, a pipeline ballast is provided for a longitudinally-extending pipeline comprising: a first pair of side sacks being flexibly connected longitudinally therebetween and having a top and a bottom; a second pair of side sacks being flexibly connected longitudinally therebetween and having a top and a bottom; aggregate ballast material for filling the first and second pair of side sacks, the filled first and second pairs of side sacks being deformable; a flexible connector extending between the top of the first pair of side sacks and the top of the second pair of side sacks and adapted to extend over a top of the pipeline with first and second pairs of side sacks adapted to straddle the pipeline; and one or more circumferential cinches adapted for extending about the first and second pairs of side sacks for compressing the first and second pairs of side sacks radially inwardly to the pipeline.

In another aspect, a strap for cinching ballast about a pipeline comprises: a circumferential and continuous strap having first and second lifting loops; a tension portion extending between the first and second lifting loops and having a length sufficient to extend about 1.5 times a circumference of the ballast when cinched about the pipeline; first and second loose ends connected to either end of the tension strap portion and having a length sufficient to overlap when the ballast is cinched about the pipeline; and cooperating fasteners fit to the overlapping first and second loose ends to secure the tension strap portion when cinched.

The pipeline ballast and cinching strap can be applied in a method for strapping pipeline ballast to a longitudinally extending pipeline comprising: providing at least two ballast sacks adapted for straddling the pipeline and being flexibly connected over a top of the pipeline; providing one or more circumferential cinches for spacing longitudinally along the ballast sacks, each having a tension portion, first and second lifting loops spaced apart along the tension strap portion, and loose ends extending from either end of the tension strap; wrapping each tension strap portion more than a circumference about the pipeline ballast; positioning the first and second lifting loops of each cinch at about opposing sides of the pipeline; lifting the lifting loops of each cinch to pull them tangentially away from each other to tighten the tension strap portion about the ballast sacks, compressing the ballast sacks radially inwardly to the pipeline; and securing the loose ends of each cinch together so as to retain tension in the tension strap portion.

Use of an inert and high density ballast material results in a low volume pipeline ballast for securing to a longitudinally extending pipeline comprising: at least two sacks manufactured of permeable material; a flexible connector between the at least two sacks and extending over a top of the pipeline for hanging the at least two sacks on opposing sides of the pipeline; an inert aggregate ballast material within the sacks, the ballast material having a density greater than that of sand or gravel; and one or more straps for compressing the sacks radially inwardly to the pipeline.

BRIEF DESCRIPTION OF THE DRAWINGS

FIGS. 9A-9F are cross-sectional and schematic sequential views of pipeline ballast being installed to pipeline. More particularly in FIGS. 9A and 9B, the pipeline ballast is lowered and placed on the pipeline, respectively. In FIGS. 9C and 9D, the cinching strap is arranged and pulled to cinch the pipeline ballast respectively. In FIGS. 9D and 9E, the strap is secured and all lifting chains removed respectively;

DESCRIPTION OF EMBODIMENTS OF THE INVENTION

Figure 1A:
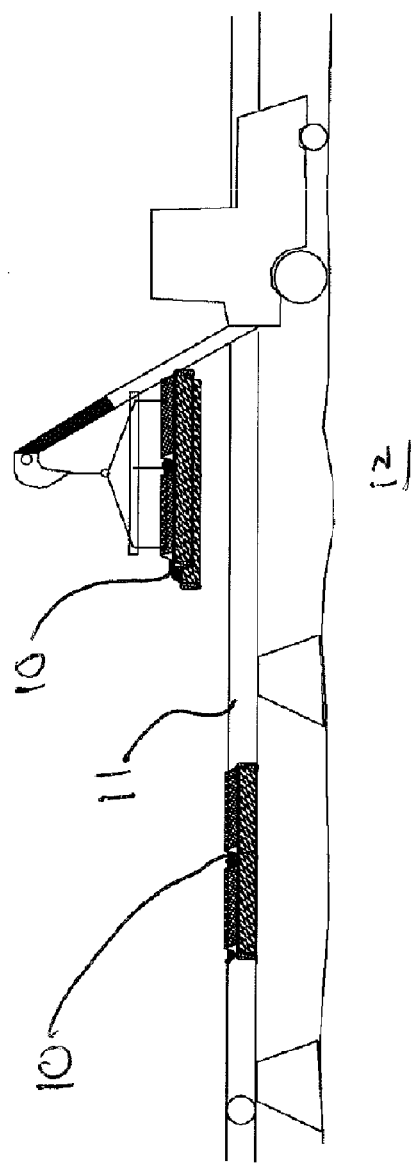
FIG. 1A is a schematic drawing illustrating installation of ballast on a pipeline before insertion.
Figure 1B:
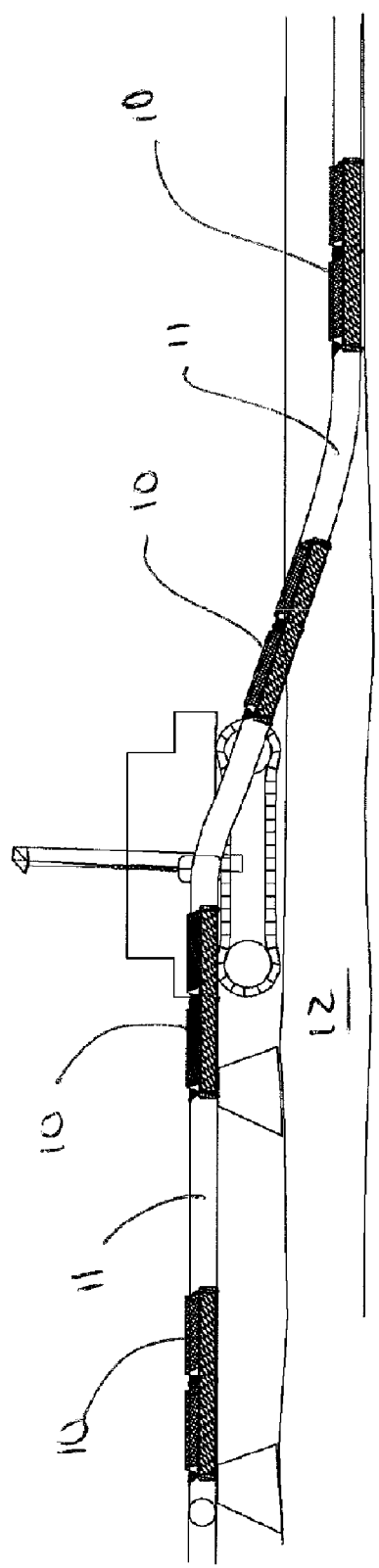
FIG. 1B is a schematic drawing of the installation of a typical smaller-diameter pipeline into a trench, illustrating installation of ballast on the pipeline before insertion.

As shown in FIGS. 1A and 1B, pipeline ballasts 10 having ballast sacks 13 may be installed on the pipeline 11 before lowering into a trench 12 in the ground. Although the context of the description is with respect to pipes and pipelines, the terms are to be equally applicable to cylindrical member and tubular conduits generally.

In one embodiment, high density aggregate ballast material "B" can be used in the ballast sacks 13, such as barite (barium sulphate $BaSO_4$) aggregate rather than the conventional use of sand or gravel "S". Barite is inert and does not leach toxic compounds which is important in wet conditions. Aggregate has voids between the particles which contain air which later is displaced by water in wet ground conditions in a trench. The higher density ballast reduces ballast sack spacing and reduces the cross-sectional profile for reducing trench size. Labor and overall cost is reduced. In some circumstances prior art sacks, using conventional aggregate ballast, may not even meet maximum spacing requirements. For example, pipeline ballasts of the current high density embodiment may only require about ½ as many weights as would be required using the prior art sand or gravel filled sacks on a sack-per-lineal unit of pipeline length comparison basis.

In this embodiment, the use of higher density materials as ballast in the sacks brings unexpected advantages. For instance, barite has a particle density about twice that of conventional aggregate (S.G. of 4.2-4.4 versus 2.3-2.8). Further, because the ballast material is provided in crushed form, with voltage, the bulk density is even lower. Buoyancy is a function of its displacement of fluid and a higher density material having lesser displacement obtains a compounding weighting effect when immersed in fluid. From Archimedes' principle, when an object is partially or fully submerged, the buoyant force, or apparent loss in weight, is equal to the weight of the fluid displaced. Barite ballast is more dense and displaces less fluid when submerged, resulting in a compounding of the residual weighting effect on the pipeline. Further, barite has a Mohr's hardness of between 3 and 3.5 which permits some crushing of sharp angular corners with reduced sack damage when cinched and may also favorably eliminates any sharp pressure points at the pipeline/sack contact which can cause corrosion of pipeline over time.

EXAMPLE

30 Inch Pipe with Barite and Sand Pipeline Ballast

The following is to demonstrate the difference between high density Barite and Sand when used as a buoyancy restraining device.

Formulas used:
  Bp=Vp*K*wlo
  Bp=buoyancy of pipe lb/ft,
  K=Environmental multiplier
  wlo=specific weight liquid outside pipe lb/ft$^3$
  Bn=wp+(Vb*wli)
  Bn=negative buoyancy lb/ft
  wp=pipe weight lb/ft
  wli=specific weight of liquid inside pipe
  Wbd=(L*Wbs*wb)/(wb−(K*wlo))
  Wbd=weight of dry ballast lb
  L=ballast spacing, wb=specific weight of ballast material lb/ft$^3$
  Vp=(pi*D^2)/(576)
  Vp=displaced volume of pipe ft$^3$/ft
  D=pipe O.D,
  Vb=(pi*d^2)/576
  Vb=pipe bore volume ft$^3$/ft
  d=pipe I.D
  Wbs=Bp−Bn
  Wbs=weight of submerged ballast lb/ft Ref: KWH PIPE engineering formula for ballast design for driscoplex OD controlled pipe, March 2002.

Assumptions:
Determine weight required for 15 foot ballast spacing.
30" pipe, I.D. 29.375"
weight of pipe wt=196.08 lb/ft
Liquid inside pipe=air+−0.08
L=15'
Dry Bulk Density (wb) of Sand=143.52 lb/ft$^3$
Dry Bulk Density Barite=262.08 lb/ft$^3$
K environmental factor=1.04
Muddy trench water out side of pipe=71.76 lb/ft$^3$ versus 62.3 for lb/ft$^3$ for water Calculation for Barite Pipe Weight in muddy trench water (71.76 lb/ft$^3$)

1. Determine the Volume of Liquid Displaced and the Buoyancy Per Lineal Foot of Pipe.

$Vp=(pi*D^2)/(576), Bp=Vp*K*wlo$ $Vp=(Pi(30)^2)/576=4.9087$ ft3/ft $Bp=(4.9087$ ft3/ft$)(1.04)(71.76$ lb/ft3$)=366.34$ lb/ft 2. Determine the Negative Buoyancy.

$Vb=(pi*d^2)/576, Bn=wp+(Vb*wli)$

Vb=4.9087 ft$^3$/ft $Bn=(196.08$ lb/ft$)+(4.9087$ ft$^3$/ft*0.08$)=196.47$ lb/ft

3. Determine Weight of Submerged Ballast.

$Wbs=Bp−Bn$

Wbs=366.34 lb/ft−196.47 lb/ft=169.87 lb/ft

4. Determine the wt of Dry Ballast $Wbd=(L*Wbs*wb)/(wb−(K*wlo))$ $Wbd=(15*169.87*262.08)/(262.08−(1.04*71.76)$
    =3562.5 lbs The permeable Barite pipeline ballast will weigh 3562.5 lbs. (Versus 5309 lbs for sand as shown below)
The total volume required for 3562.5 lbs. V=Wbd/wb Volume=3562.5 lbs/262.08 lb/ft$^3$=13.59 ft$^3$ Calculation for Sand Pipe Weight in muddy trench water (71.76 lb/ft$^3$)

1. Determine the Volume of Liquid Displaced and the Buoyancy Per Lineal Foot of Pipe.

$Vp=(pi*D^2)/(576), Bp=Vp*K*wlo$ $Vp=(Pi(30)^2)/576=4.9087$ ft3/ft $Bp=(4.9087$ ft3/ft$)(1.04)(71.76$ lb/ft3$)=366.34$ lb/ft 2. Determine the Negative Buoyancy.

$Vb=(pi*d^2)/576, Bn=wp+(Vb*wli)$

Vb=4.9087 ft$^3$/ft $Bn=(196.08$ lb/ft$)+(4.9087$ ft$^3$/ft*0.08$)=196.47$ lb/ft

3. Determine Weight of Submerged Ballast.

$Wbs=Bp−Bn$

Wbs=366.34 lb/ft−196.47 lb/ft=169.87 lb/ft

4. Determine the wt of dry ballast $Wbd=(L*Wbs*wb)/(wb−(K*wlo))$

Wbd=(15*169.87*143.52)/(143.52−(1.04*71.76)=5308 lbs (Versus 3562.5 lbs for barite)
The permeable Sand pipeline ballast will weigh 5308 lbs.
The total volume required V=Wbd/wb
Volume=5308 lbs/143.52=36.98 ft$^3$ The weight of Barite required would be 3563 lbs and the weight of Sand required would be 5308 lbs. Thus the Barite weights are only 70% of the sand weight (the equivalent sand sacks weigh 50% more) so as to achieve the same effect. Even more dramatic is the volume of Barite required of 13.59 ft$^3$ compared to the volume of Sand required of 36.98 ft$^3$. The Barite weights would be only about 40% of the volume required using sand (the equivalent sand sacks consume 170% more volume).

Effect of Trench Liquid Density

The difference in size and weight between Sand and Barite pipeline ballasts increases as the density of the trench fluid increases. The calculation above assumed a muddy slurry with a density increase to 71.76 lb/ft$^3$ versus a water density of 62.3 lb/ft$^3$.

When the trench contains a slurry (which is characteristic of most wet trench environments), the weight requirements would be increased substantially over that needed for water due to the higher density of the slurry, which further increases the advantage for using barite.

In water, the permeable Barite pipeline ballast would weigh 2423 lbs. As shown above, in a common trench slurry, the barite required would be 3563 lbs. which is nearly an additional 50% of extra weight. For sand weights in water, the pipeline ballast would weigh 3325 lbs. Again, for a trench slurry, the sand pipeline ballast would weigh 5308 lbs. which is an additional weight of nearly 60%.

The comparison of volume savings would be even more dramatic. When pipeline ballast is in water or slurry, sand sacks consumes 36.98 ft$^3$ and Barite sacks consume 13.59 ft$^3$ respectively for a ratio of 2.72. The sand sacks would be 2.72 times larger than the Barite sack and would weigh (5308 lbs/3563 lbs=1.49) 1.49 times or 50% heavier.

Further, to minimize the size of the trench required, the ideal pipeline ballast sack should not be resting below the bottom of the pipeline. Therefore, it follows that the entire 2.72 times the volume of sand should be placed laterally in the trench resulting in a tremendous increase in the volume of dirt that has to be removed from the trench to facilitate the larger sand pipeline sacks.

In addition, the number of sacks that would be required per unit length of pipeline would be reduced dramatically when using the barite filled pipeline sack weight.

The combination of these two factors results in dramatic cost saving for the pipeline project.

END EXAMPLE

Over and above the greater weight that can be applied, a much smaller sack volume results which leads to advantages including smaller trenches and thus less material handling and less expense. In the case of large diameter pipelines, it is convention to prepare a trench to allow for 12 inches space on either side of the pipe with periodic cross-ditches where the pipeline ballasts will be placed. Use of the smaller sacks of the present invention will fit in the pipeline trench and can eliminate the added labor involved with this prior art cross-ditching.

Further, for example in one possible scenario, using higher density ballast B, a 50" (12+26+12) wide trench 12 could accommodate a large diameter pipeline 11 of about 26" pipe. For use with conventional gravel or sand S pipeline ballasts, typically a wider and deeper wide trench 12 (which could be in the order of 96" (35+26+35) wide) would need to be excavated with all the associated additional cost. Of course trench sizes vary with different pipelines 11 and would vary with different ground conditions.

Figure 2B:
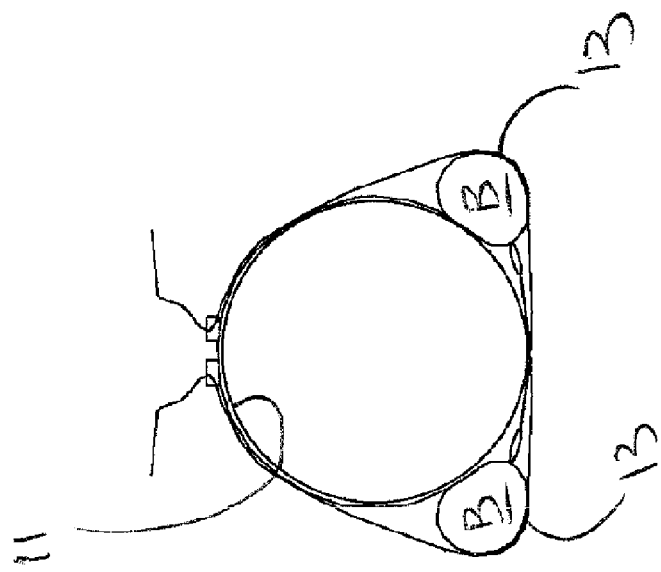
FIG. 2B illustrates a high-density embodiment of one form of pipeline ballast invention installed to a smaller pipeline such as that of FIG. 2A wherein the ballast sacks are substantially level with the bottom of the pipeline and are thereby substantially supported with minimum stress to the pipeline.
Figure 2A:
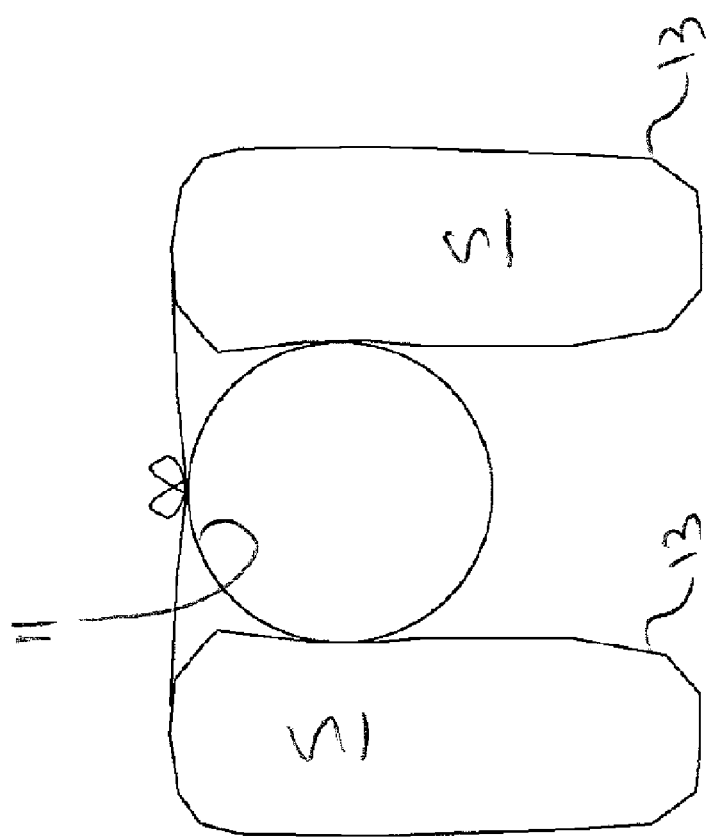
FIG. 2A illustrates one form of prior art sack installed to a pipeline.
Figure 2C:
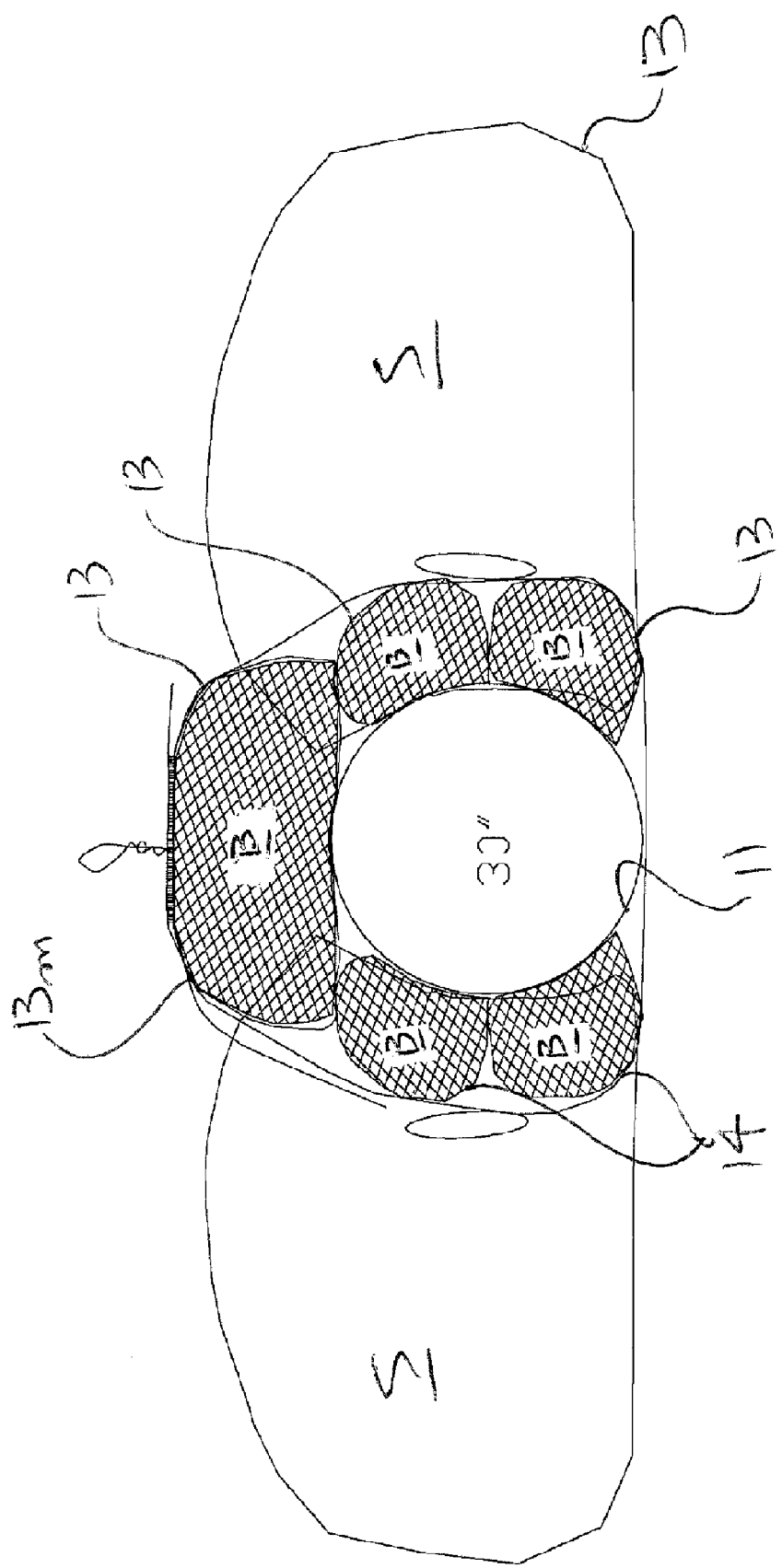
FIG. 2C illustrates a high-density embodiment of the current invention installed to a larger pipeline wherein the bottom of the ballast sacks are substantially level with the bottom of the pipeline and are thereby substantially supported with minimum stress to the pipeline. A prior art sack profile is also illustrated for comparison.

With reference to prior art FIG. 2A and compared to embodiments of the present pipeline ballasts 10 having high density ballast of FIGS. 2B and 2C, one can see that sacks 13 containing lower density ballast such as sand S are larger and have a wider and deeper profile as they rest on the bottom of the trench 12. When the environment softens, or thaws, the pipeline 11 may still have some movement as the ballasts 10 shift on the pipeline 11. Thus, smaller higher-density sacks 13 can provide greater conformity to the pipeline 11 resulting in easier handling during installation and less shifting of the ballast 10 in use. More preferably hinged-style sacks 13, as discussed in more below, further improve conformity to the shape of the pipeline 11 and facilitate ease of loading onto the pipeline The smaller sacks 13 are positioned adjacent the bottom level of the pipeline 11 which allows the ground to support some of the weight of the sack 13 and not the pipeline 11. The bottom of the ballasts 10 are at the same level as the bottom of the pipeline 11 which allows for the ballast 10 to snug up around the pipeline 11 and be cinched radially inwardly and tight thereto while still having the ground take some of the weight of the pipeline 11 and the weight of the sacks 13. However, when the pipeline 11 is filled with gas or liquids, the full weight of the pipeline sacks 13 are immediately applied around the pipeline 11 due to the snug nature of the tightening device.

Permeable sacks 13 assist in enabling low density air to be displaced by higher density liquids, such as mud, when submerged.

With reference to FIGS. 2B and 2C, a ballast implementation of a high-density embodiment of the current high density embodiment is shown for a 30 inch pipeline 11 in contrast with the required equivalent volume using a conventional prior art sack profile filled with gravel or sand S.

Figure 3A:
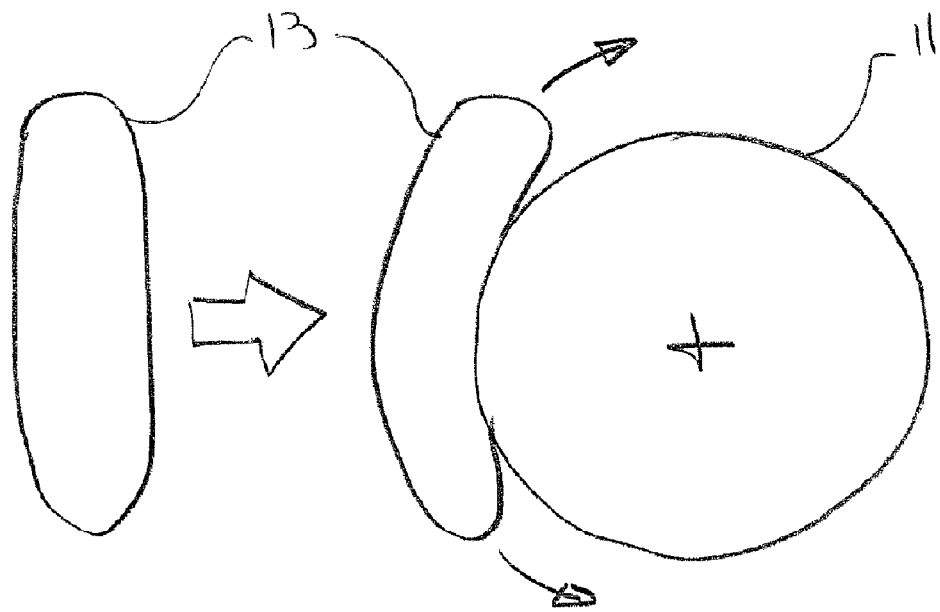
FIG. 3A illustrates one embodiment of a high density sack in cross-section before and after cinching to a pipeline.
Figure 3B:
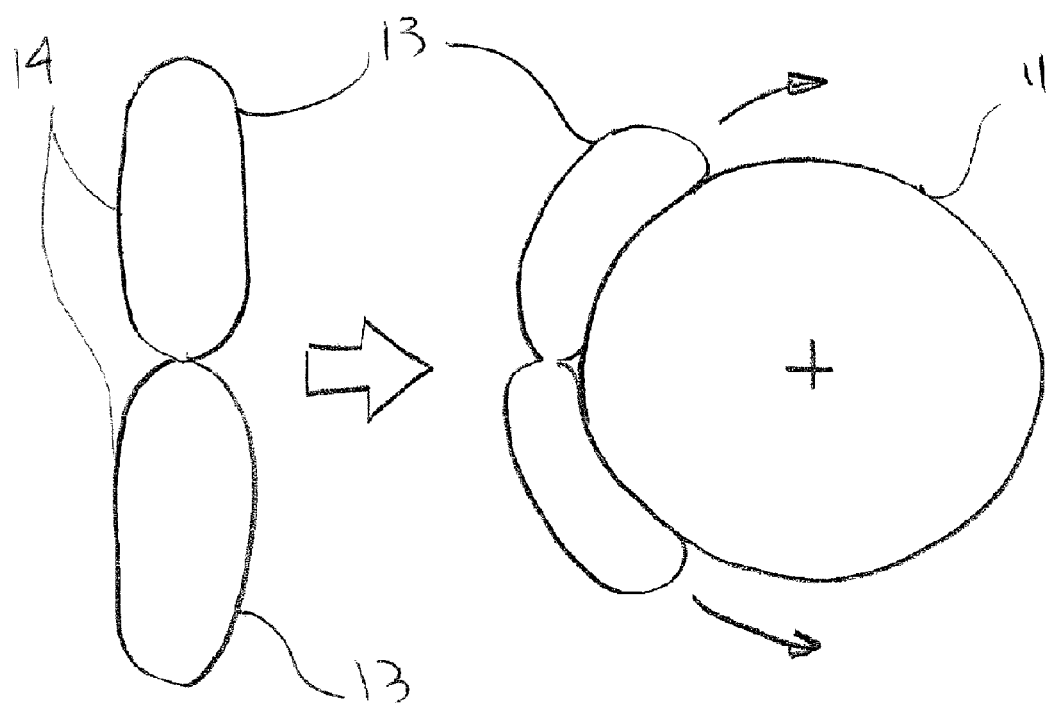
FIG. 3B illustrates another embodiment of the high density sack, shown in cross-section before and after cinching to a pipeline, the sack having a flex point or hinge.

With reference to FIGS. 3A and 3B, optionally, the sacks 13 of FIG. 3A may be replaced with a pair of sacks 14 having one or more intermediate seams forming flex-points or hinges for greater flexibility and conformance to the pipeline 11.

As in the earlier embodiment, pairs of ballast sacks 14 are joined with a connecting web which extends over a top of the pipeline 11 to hang the at least two sacks on opposing sides of the pipeline 11. The pairs of ballast sacks 14 can be suspended and lowered onto the pipeline 11 from lifting straps or one or more loops.

Figure 4A:
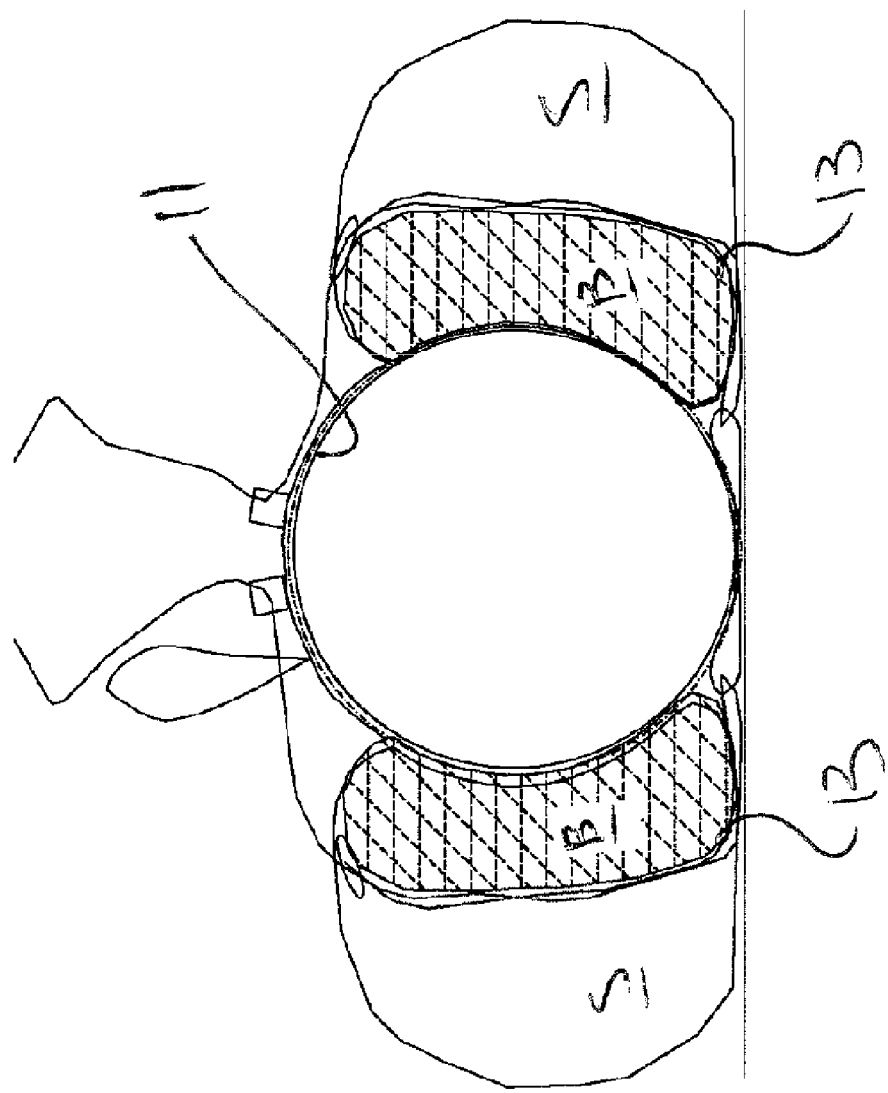
FIG. 4A illustrates the relative sizes of ballast sacks, using high density barite and with sand, fit to a pipeline 26" in diameter.

FIG. 4A illustrates one generic embodiment of high density barite ballast sacks 13 applied to a 26" diameter pipeline 11. As shown, this conventional style of sack 13 is illustrated with the high density barite fill B at 268 lb/ft$^3$ (8,698 lbs, for both sides combined) with an overall width of about 40 inches and compared with a sack filled with prior art sand/gravel S at 160 lb/ft$^3$ (12,101 lbs, for both sides combined) with an overall width of 64 inches. The typical length of pipeline ballast sacks 13 according to one embodiment of the invention is 15 feet long and spaced every 30 feet center to center. Shorter pipeline ballasts 10 would be spaced more frequently. As shown, the barite sacks 13 required 3403 lbs. less weight than sand/gravel sack and requires 2.72 times less volume than the sand/gravel sack. In fact, sand ballast S would have to be substantially continuous along the pipeline 11 to result in the demonstrated profile. If sand ballast S were spaced at 30 foot intervals, the profile would be about twice as large as the large profile already represented in the drawing.

Figure 4B:
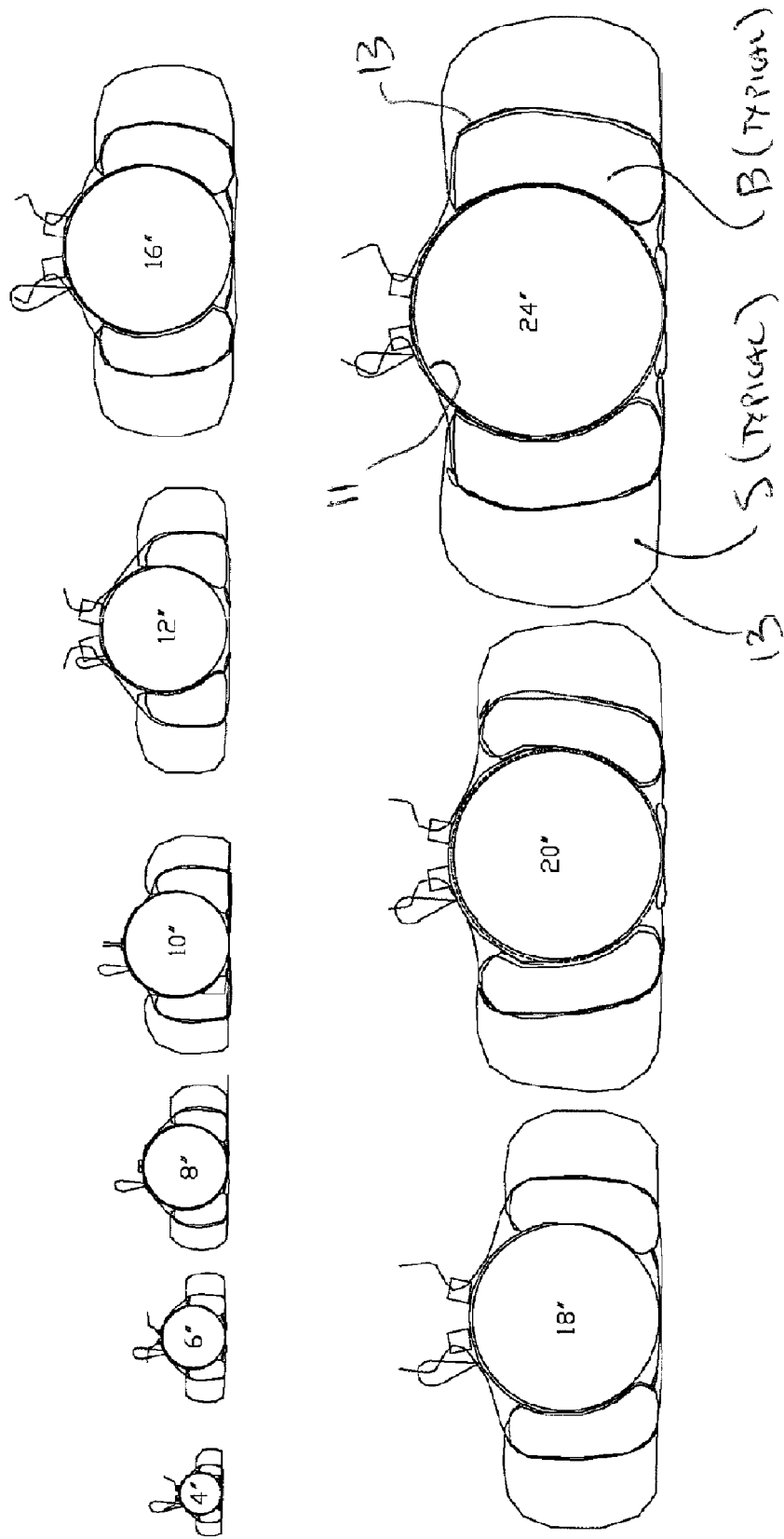
FIG. 4B illustrates relative sizes of ballast sacks fit to various sizes of pipelines ranging from 4 inch to 24" in diameter, illustrating the smaller high density barite ballast compared to larger sand ballast.
Figure 4C:
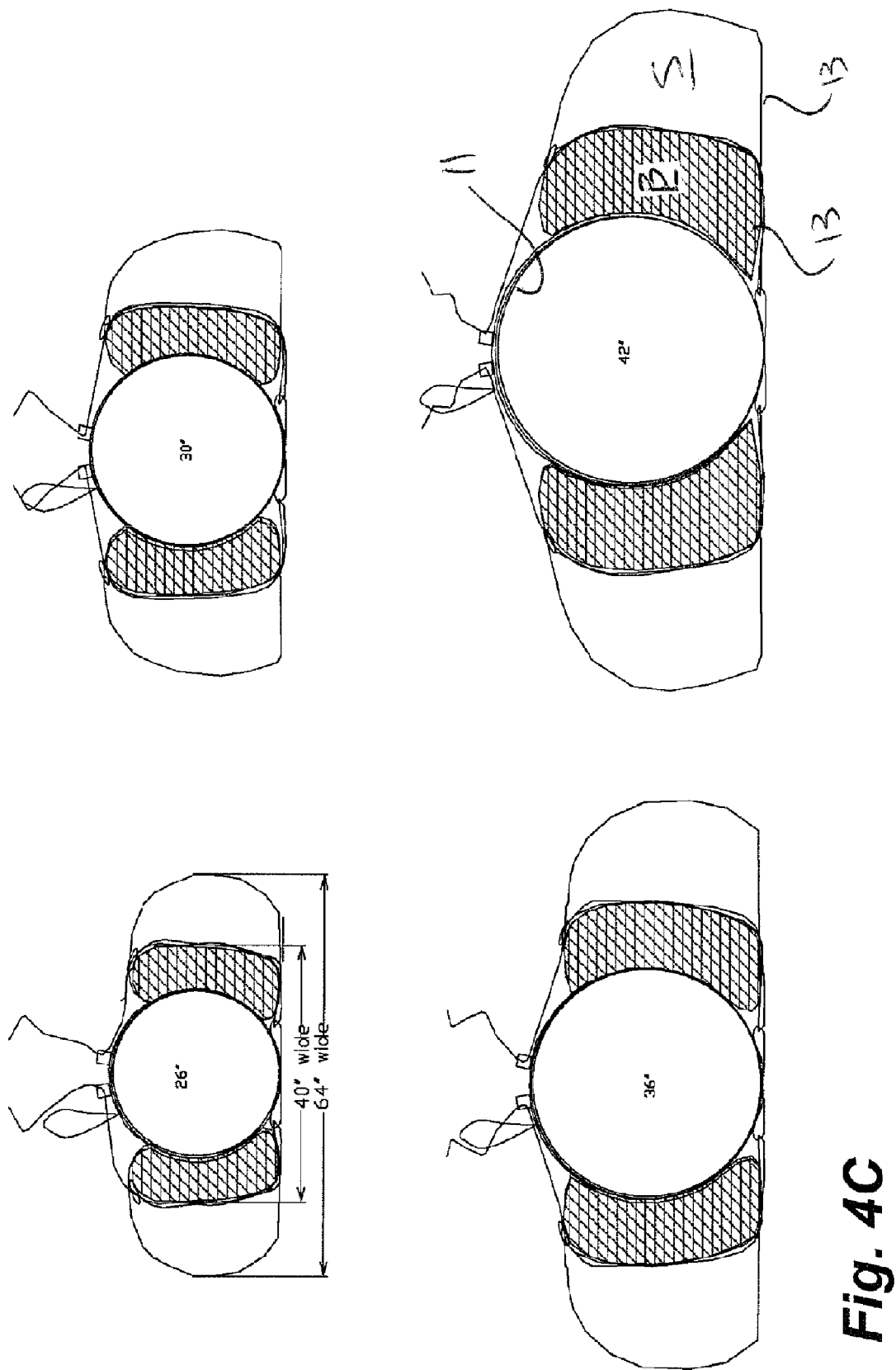
FIG. 4C illustrates relative sizes of ballast sacks fit to various sizes of pipelines ranging from 26 inch to 42" in diameter, illustrating the smaller barite ballast compared to larger sand ballast.

FIGS. 4B and 4C illustrate relative sizes of ballast sacks 13 of similar design (both high density barite and sand) fit to various sizes of pipelines 11 ranging from 4 inch to 42" inch diameter.

Other embodiments, using the hinged-style of embodiment are typically 7 feet long for ease of handling.

With reference to FIGS. 5-12F, in another embodiment, an improved pipeline ballast is provided in the form of an improved arrangement of sacks 13 cinched to the pipeline 11. Further, preferably a circumferential cinch in the form of a unique and unitary cinching strap 50 is used which simplifies handling and ensures a secure grip to the pipeline 11. The cinching strap 50 is arranged to extend about the circumference of the pipeline 11 and spaced radially outward and about the sacks 13. When cinched, the cinching strap 50 draws radially inwardly and compresses the sacks 13 to the pipeline 11. The aggregate can shift within the sack 13 to conform to the pipeline 11.

Figure 5:
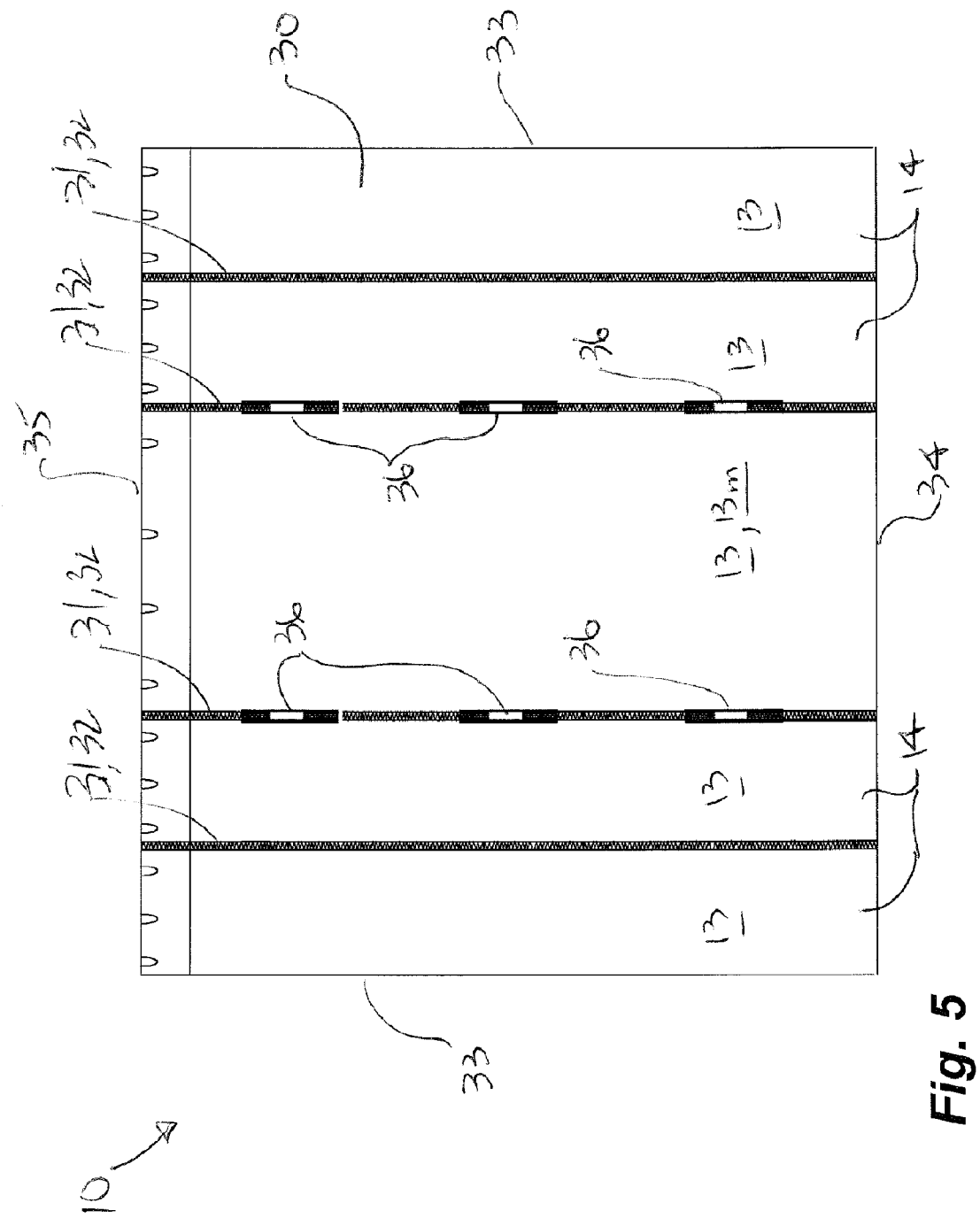
FIG. 5 is a layout of the sack materials of an embodiment of the invention.

With reference to FIG. 5, in one embodiment, the improved sacks 13 comprise a permeable material such as geotextile material 30 formed into a plurality of discrete sacks 13. Each sack 13 is connected to an adjacent sack 13 by flex-points or hinges 31. Two layers of textile 30 are joined, such as by sewing together, along substantially parallel and longitudinally-extending seams 32 forming sacks 13 therebetween. The longitudinal seams 32 extend substantially parallel to a longitudinal axis of the pipeline 11 and form the hinges 31. The seams 32 are reinforced to resist tearing.

As shown in FIG. 5, a flat layout of an overlying layer of a geotextile pipeline ballast 10 is shown sewn along a plurality of parallel seams 32 to an underlying layer (not shown). As a result of the partitioning by the parallel seams 32, five discrete sacks 13 are shown as formed between the left and right or first and second lateral and longitudinally-extending peripheries 33. Four intermediate seams 32 form five sacks 13 between the left and right lateral peripheries 33 which ultimately form opposing bottom edges in operation. The middle sack 13m forms the top sack, and the four remaining sacks 13 form first and second pairs of side sacks 14, two sacks 13,13 on each side of the pipeline 11. A first end 34 of the overlying and underlying layers 30o,30u is joined to close one end of the five sacks 13 and a second end 35 is open to enable filling of the sacks 13.

The middle sack 13m is bracketed by seams 32 characterized by stronger reinforcing, particularly about two or more lifting strap ports 36. Three ports are shown along each bracket seam 32. Lifting straps 37 (FIG. 6) can be passed through the ports 36 to support the underside of the middle sack 13m and thus support the entire pipeline ballast 10 for manipulation.

Figure 6:
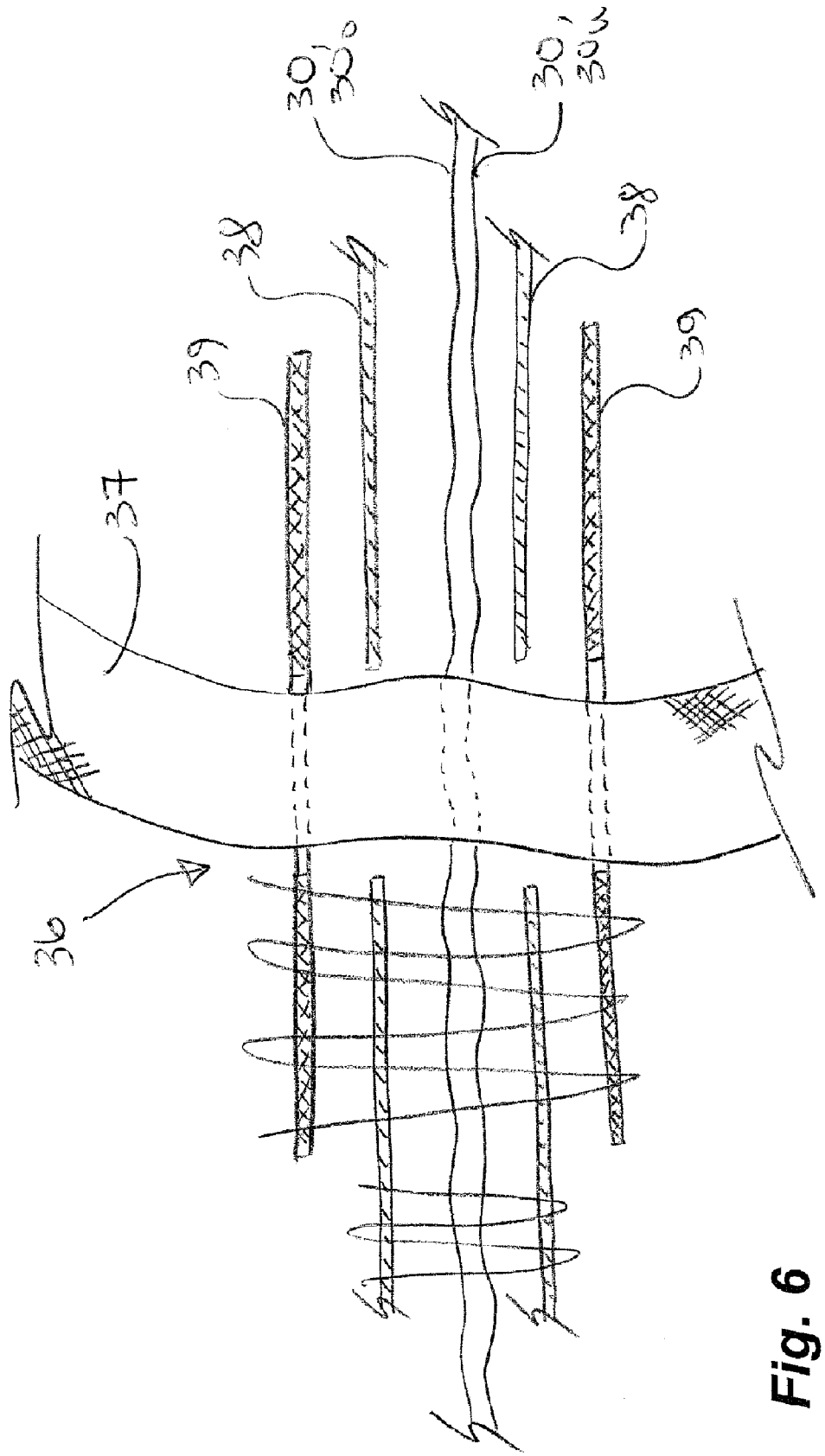
FIG. 6 is an exploded and partial cross section of the lifting ports of the pipeline ballast according to FIG. 5.

With reference to FIG. 6, the lifting strap ports 36 are formed by holes formed through the geotextile 30, and the seams 32 about the holes are reinforced by sandwiching material about the hole between narrow webbings 38 extending along the longitudinal seam 32 and which can be discontinuous at the hole. A further reinforcement 39, such as woven strap material, which is wider than the hole, overlies the webbings 38, sandwiching the webbings 38 and the geotextiles 30o,30u therebetween. The lifting strap 37 can pass directly through the port 36. This reinforcing 38,39 provides extra strength when lifting and handling and prevents tearing along high stress points.

Figure 7:
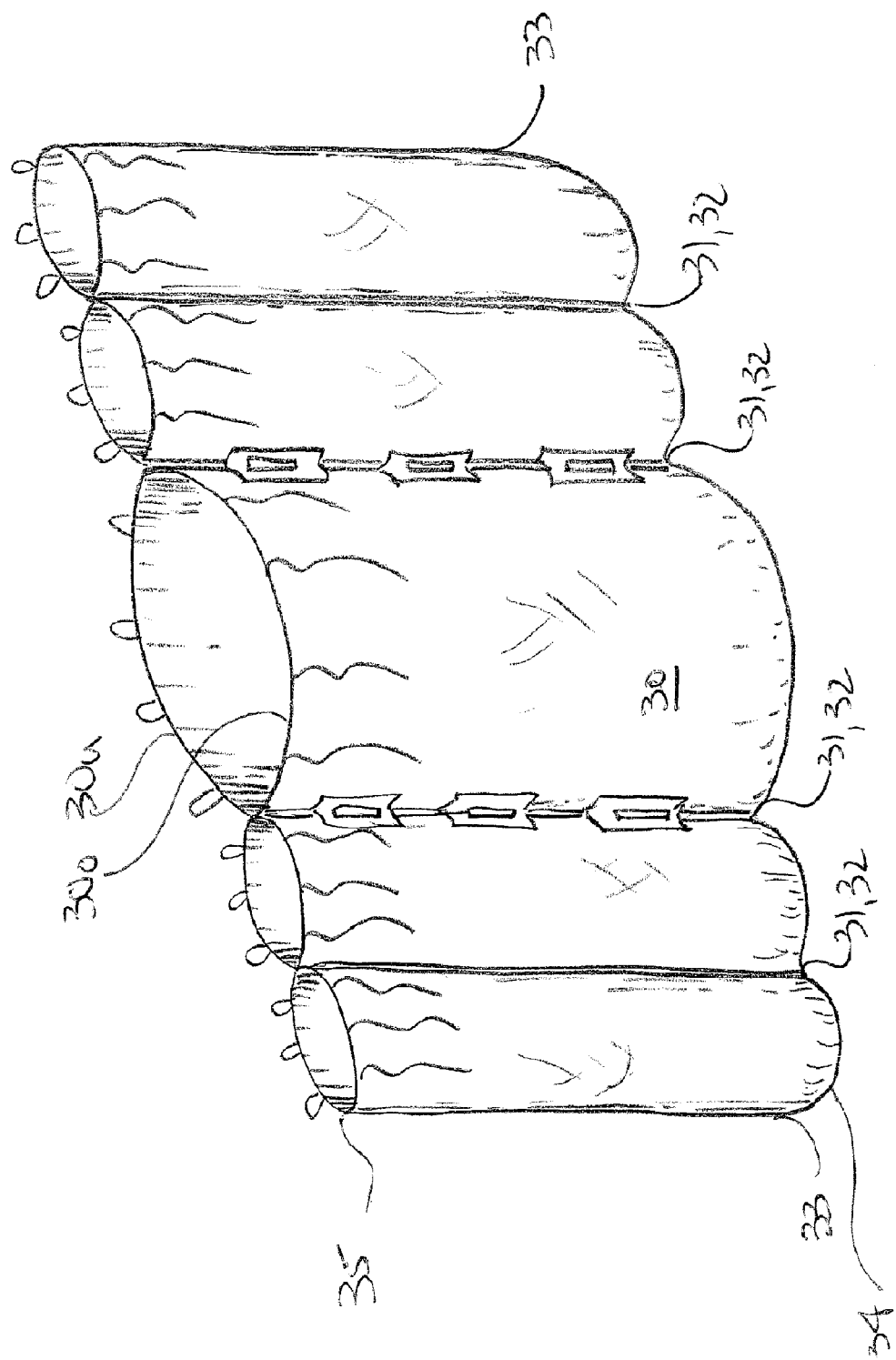
FIG. 7 is a perspective view of the pipeline ballast according to FIG. 8 ready for filling with ballast.

With reference to FIG. 7, the over and underlying layers 30o,30u form pockets 40 into which ballast can be filled or placed. The two lateral peripheries 33 and the first closed end 34 are shown already closed by joining, such as by folding, a continuous sheet of geotextile 30 or otherwise by sealing open edges such as by sewing.

The five chamber pipeline ballast can be supported in a frame with the second open end 35 oriented upwardly for filling (not shown).

Figures 8A, 8B, 8C, 8D:
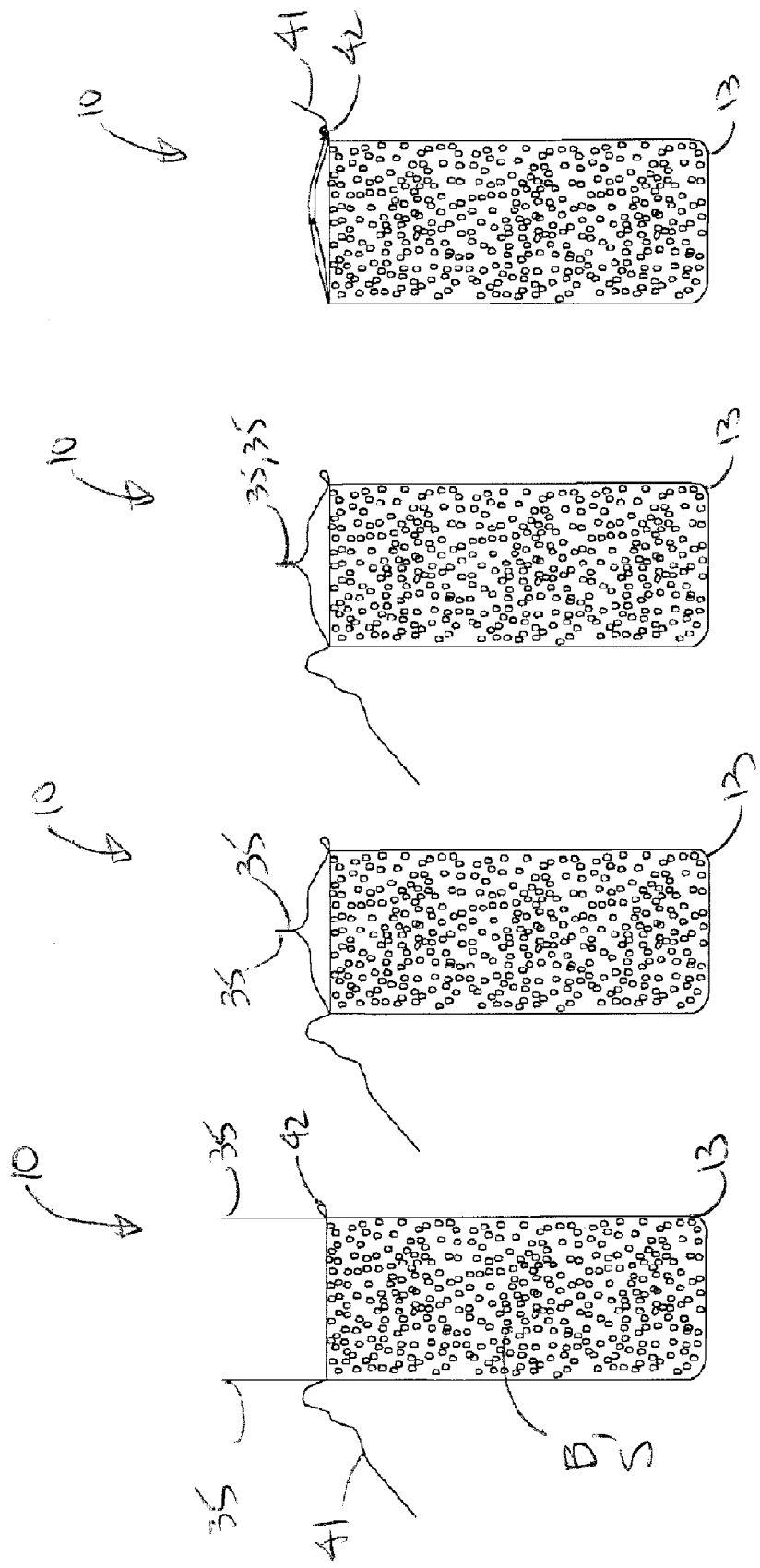
FIGS. 8A-8D are sequential views of the filling, closing, sealing and securing of the sacks of FIG. C respectively.

With reference to FIG. 8A-8D, the sacks are filled (FIG. 8A). At FIG. 8B, the second open filling end 35 is closed and sealed such as by sewing (FIG. 8C). At FIG. 8D, to strengthen the seamed filling end 35,35, ropes 41 can be passed across the second end 35 and through opposing loops 42 and drawn tight to minimize the stress on the second and now sealed filling end 35,35.

With reference to FIGS. 9A and 9B, the pipeline ballast 10 is suspended by one or more lifting straps 37 supporting the middle sack 13m and lowered over the pipeline 11. Typically, each lifting strap 37 is rated for 10,000 pounds. Each lifting strap 37 is knotted in the center or top. The side sacks 14,14,13,13 hang from the middle sack 13m at about the width of the diameter of the pipeline 11. When lowered over the pipeline 11, the first and second pairs 14 of side sacks flex about the seams 31,32 to partially conform to the pipeline 11. The hinged design allows the side sacks 14 to be configured to initially hang slightly wider than the diameter of the pipeline 11, which aids in smooth loading of the pipeline ballast 10 and eliminating hang-ups between the side sacks 14,14 and a top of the pipeline 11.

As shown in FIG. 9C, a cinching strapping system is used to secure the pipeline ballast 10 to the pipeline 11. The cinching strap 50 is wrapped about twice about the circumference of the pipeline ballast 10.

With reference to FIG. 9D, the cinching strap 50 is gripped at two points 51 opposing adjacent a bottom of the ballast 10. As shown in FIG. 9E, when the cinching strap 50 is lifted by points 51, the cinching strap 50 tightens about the sacks 13, compressing and conforming the aggregate ballast within the sacks 13 to the pipeline 11. As shown in FIG. 9F, loose ends 52 of the cinching strap 50 are secured adjacent at the top of the pipeline 11.

Figure 10:
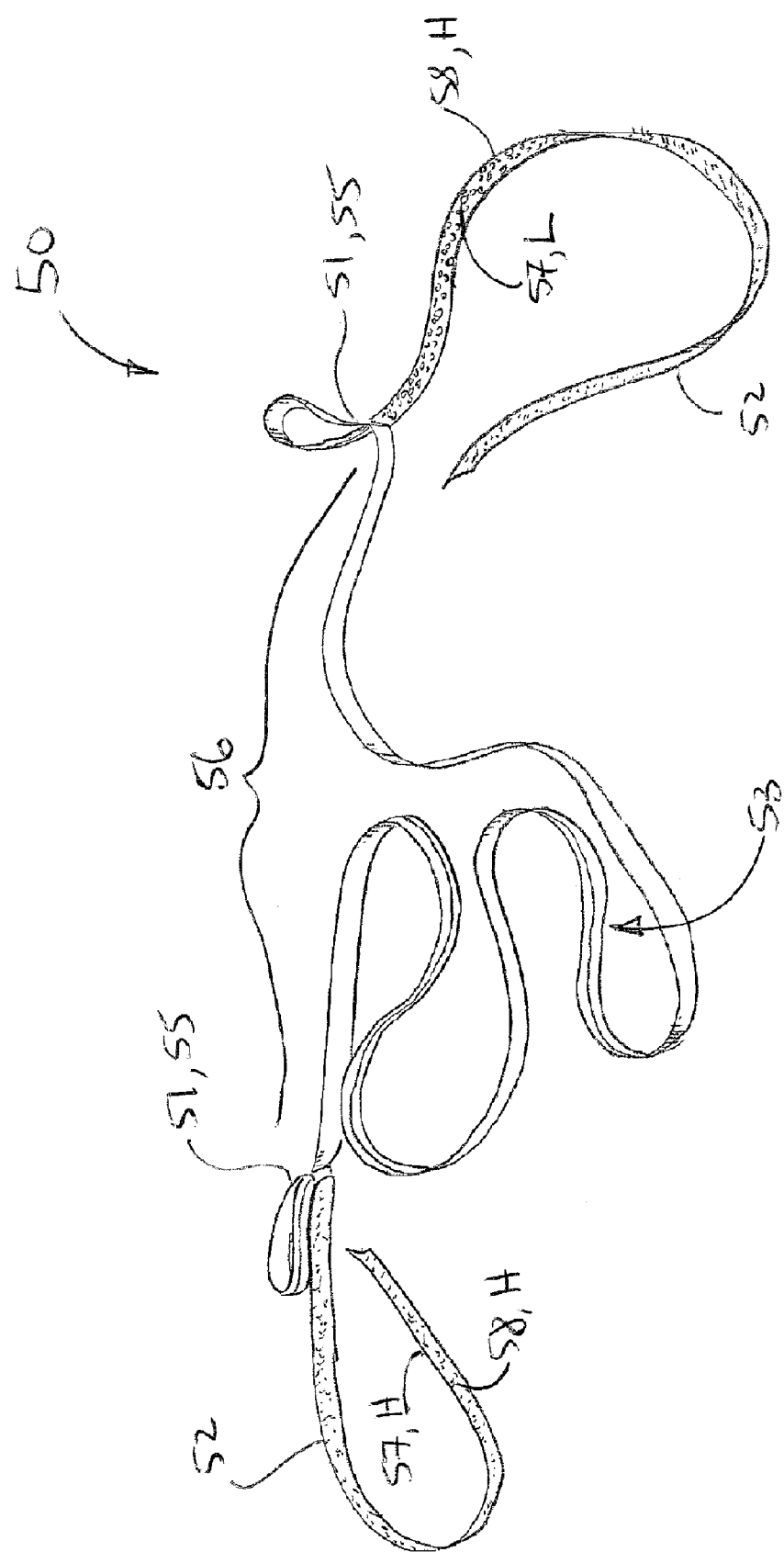
FIG. 10 is a perspective view of an embodiment of a cinching strap.
Figure 11:
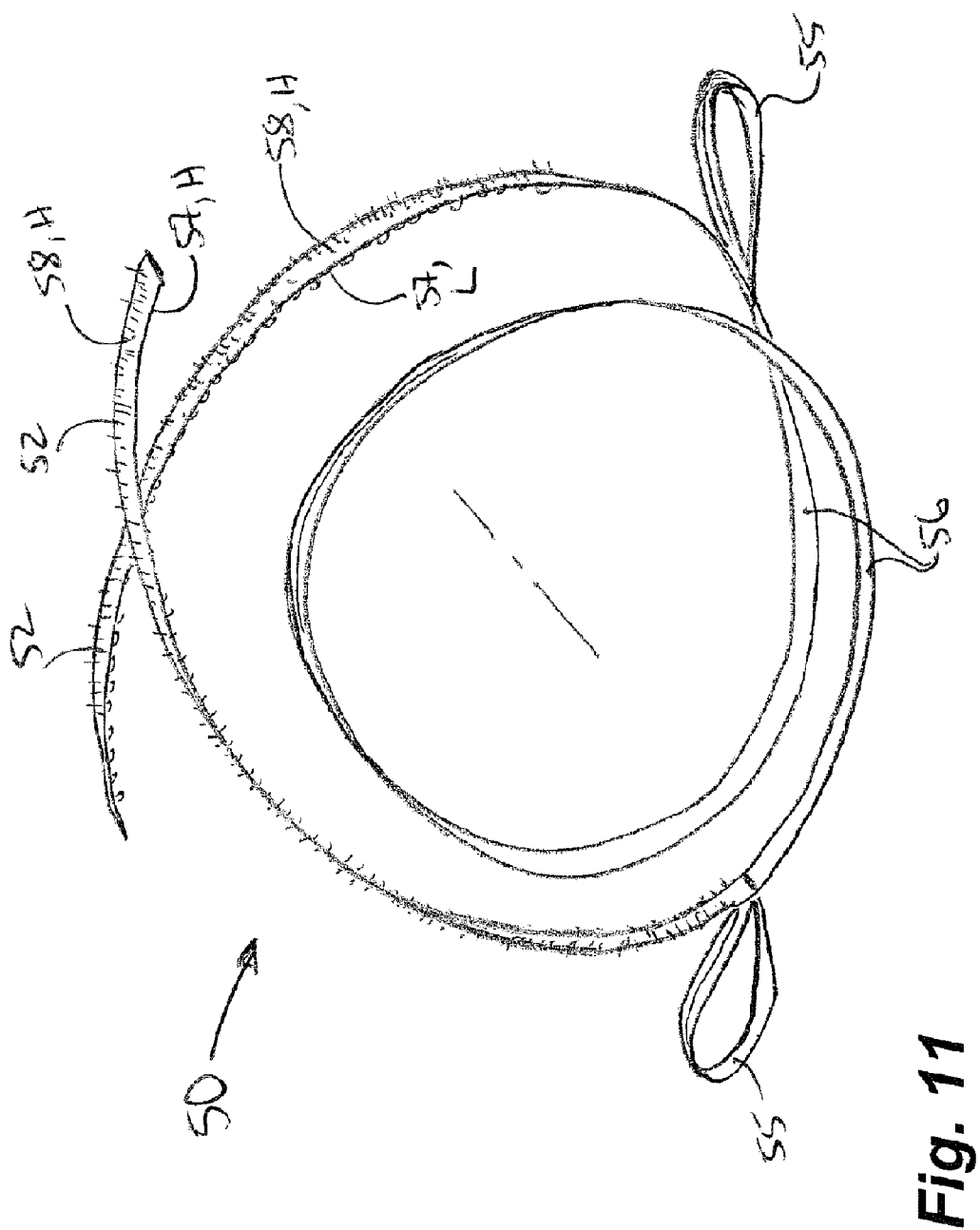
FIG. 11 is a perspective view of the cinching strap of FIG. 10, wrapped about a pipeline ballast (not shown for better illustrating the strap)

More preferably, as shown in FIGS. 10 and 11, the cinching strap 50 can have a configuration which minimizes handling problems. The strapping system uses a single cinching strap 50 which is simple, easy to use and strong. The cinching strap 50 is separate and need not be attached to the pipeline ballast 10. The cinching strap 50 can also be fit with a visual indicator of the pipeline side and the ground side, such as colored stripe 53 woven into an underside of the strap 50.

The cinching strap 50 has lifting points 51 comprising first and second loops 55, between which extends a tension strap portion 56. The lifting loops 55 may be formed by folding the tension strap portion 56 onto itself at two points and joining the folds together such as by sewing. The first and second lifting loops 55 could also be discrete loops sewn to the tension strap portion 56.

The length of the tension strap portion 56 spaces the lifting loops 55 at a position for maximum tightening. The tension strap portion 56 extends more than a circumference of the pipeline ballast 10 straddling the pipeline 11 so that the loops 55 are pulled tangentially from opposing sides of the pipeline 11. Preferably, the lifting loops 55 are positioned adjacent a bottom of the pairs of side sacks 14 where maximum cinching load can be imparted by pulling the loops 55 tangentially away from each other and so that the majority of tension can be on the bottom of the pipeline 11 to ensure maximum tightening. The tension strap portion 56 would be about 1.2 to 1.5 times the circumference of the pipeline ballast 10 when in place. The lifting loops 55 are pulled upwards and pull the strap slack up and tight to the pipeline 11 to avoid movement of the ballast 10 during angled installation. This strapping system utilizes the pipeline loading equipment to apply as much tension to the cinching strap 50 as required to secure the pipeline ballast 10.

The cinching strap 50 further comprises the opposing first and second trailing loose ends 52,52 connected to either end of the tension strap portion 56 and having a length sufficient to overlap when the pipeline ballast 10 is cinched to the pipeline 11. The first and second trailing loose ends 52,52 are fit with cooperating hook and loop type of fasteners, such as Velcro™, fit to the overlapping first and second loose ends 52,52. The cinching strap 50 is continuous or unitary in that tension can be maintained along the cinching strap 50 between the first and second loose ends 52,52; the tension being sufficient to maintain the compression of the sacks 13 to the pipeline 11. The strap 50 is continuous in that it may be constructed of a single continuous length of strap material or that it is assembled of two or more pieces, which once assembled can accept the necessary tension.

The cinching strap has two opposing surfaces 57,58. At least an inside surface 57 of the first loose end 52 and the opposing outside surface 58 of the other second loose end 52 are fit with the complementary hook H or loops L for mating and securing the strap 50 to itself. More advantageously, the other opposing surfaces of the first and second loose ends 52,52 are fit with the hook H fasteners which can be used to temporarily grip virtually anywhere on the geotextiles 30 for ease of handling intermediate the cinching operation. In other words, the first loose end 52 is preferably fit with a loop L fastener on one surface 57 and a hook H fastener on the other surface 58 while the second loose end 52 is preferably fit with a hook H fastener on both surfaces 57,58.

Returning to FIG. 9C, the cinching strap 50 is placed on the ground with the tension strap portion 56 under the pipeline 11. The first loose end 52 extends downwardly to the first lifting loop 55 adjacent the bottom of a pair of side sacks 14 on one side of the pipeline 11 and the other second loose end 52 is wrapped twice about the circumference of the pipeline 11 so that the tension strap portion 56 is wrapped more than a circumference of the pipeline ballast 10. This wrapping arranges the second lifting loop 55 also adjacent the bottom of the other pair of side sacks 14 on the other side of the pipeline 11. As the cinching strap 50 is being manipulated about the pipeline ballast 10, the hook H fasteners at the first and second loose ends 52,52 can be temporarily adhered to the sack materials 30 to minimizing fumbling. With the first and second loose ends 52,52 substantially unrestrained, a backhoe, crane or other equipment is temporarily secured by a lifting device 60, such as by chains, to each of the first and second lifting loops 55,55. Tension is applied substantially equally to the lifting loops 55,55, pulling them tangentially away from each other and tightening the tension strap portion 56.

Thereafter, the loose ends 2,52 are secured together to retain tension in the tension strap portion 56. Preferably, hook H and loop L fasteners of the first and second loose ends 52,52 are merely pressed together. While easy to engage and pull apart in tension, the hook H and loops L are virtually impossible to shear apart when the only force is along the strap 50.

The pairs of side sacks 14 are forced to conform to the pipeline 11 and thereby present a narrow profile for lowering into narrow trenches 12. Used in combination with high density ballast, trench sizes can be significantly minimized.

Figure 12A:
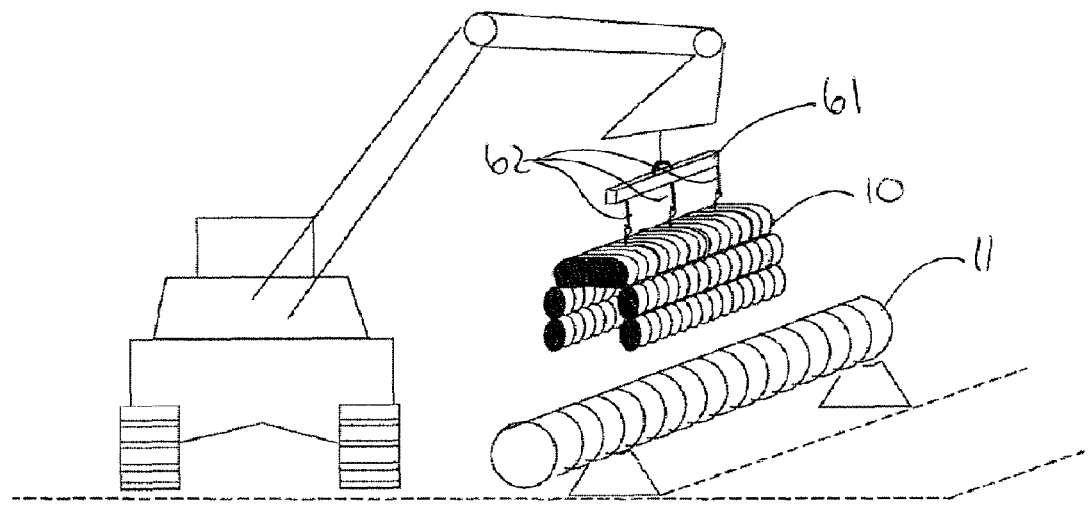
FIGS. 12A-12F are perspective sequential views of a backhoe placing a pipeline ballast on a pipeline.
Figure 12B:
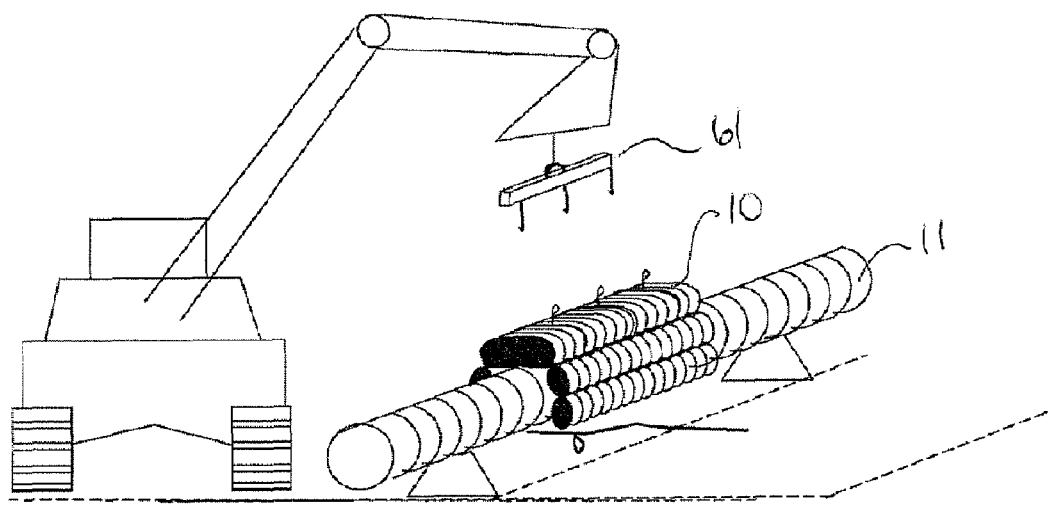

With reference to FIGS. 12A-12F, in operation, a pipeline ballast 10 according to the present invention is installed to a pipeline 11. As shown in FIG. 12A, a spreader bar 61, having three lift points 62, supports the ballast 10 with the pairs of side sacks 14 straddling the pipeline 11. In FIG. 12B, the pipeline ballast 10 is set down on the pipeline 11 and the spreader bar 61 disengaged.

Figure 12C:
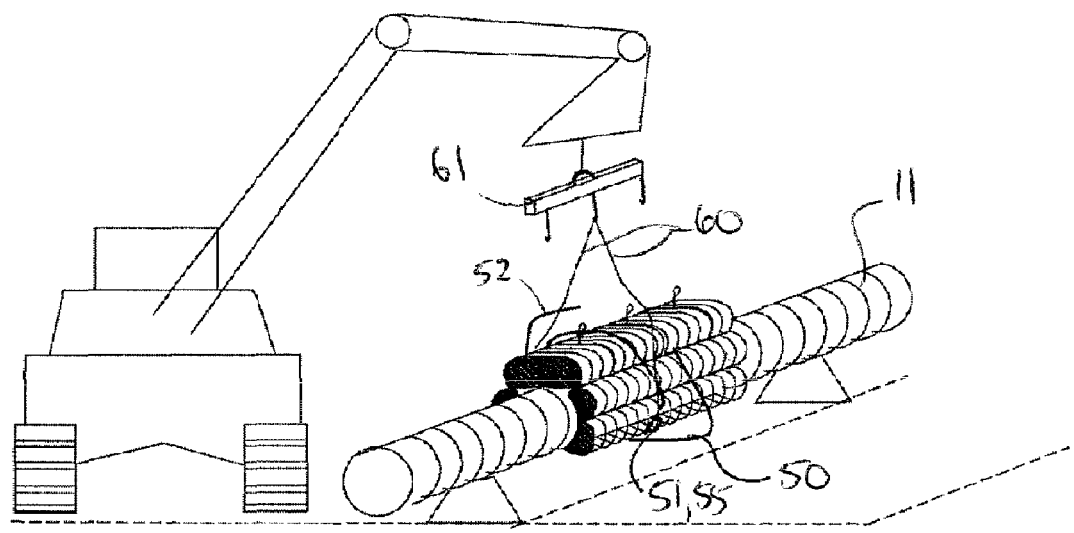

In FIG. 12C, one cinching strap 50 is wrapped twice about the pipeline ballast 11. One or more cinching straps 50,50,50 could be used spaced along the pipeline ballast 10. As shown, a chain lifting device 60 is supported by the spreader bar 61 and engages the two lifting loops 55. While one cinching strap 50 is shown for clarity of the drawing, three cinching straps 50,50,50 could be simultaneously installed and lifted by the three points 62,62,62 of the spreader bar 61.

Figure 12D:
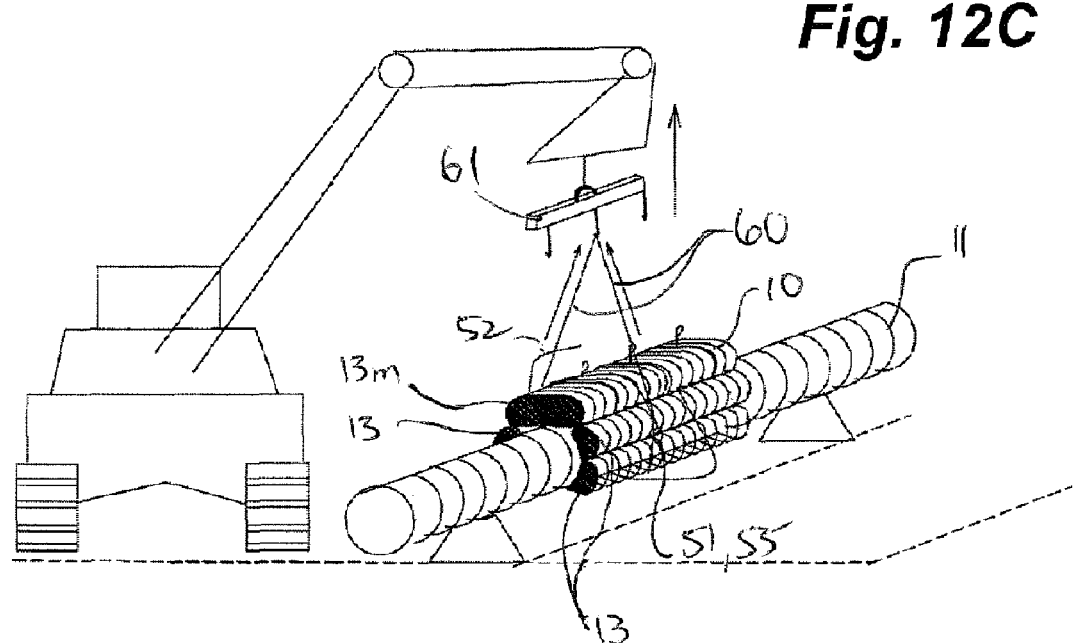
Figure 12E:
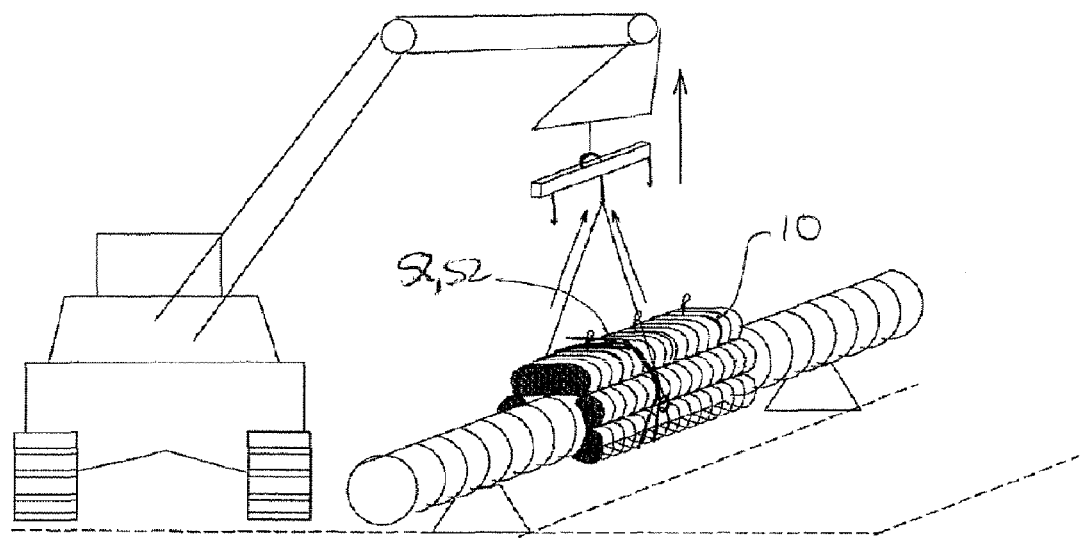
Figure 12F:
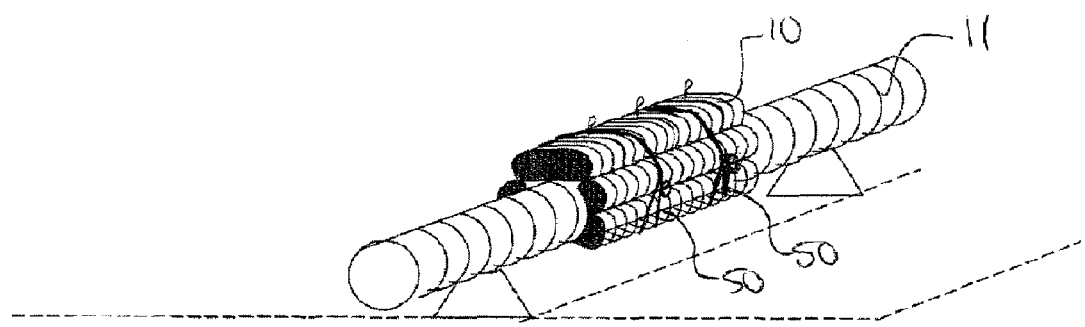

In FIG. 12D, the lifting loops 55 are pulled to secure the pipeline ballast 10 to the pipeline 11 while conforming the sacks 13 to the shape of the pipeline 11. In FIG. 12E, the loose ends 52,52 are secured and in FIG. 12F, the lifting equipment and chains are removed and two cinching straps 50,50 are illustrated. The pipeline 1 is ready for insertion into a trench (not shown).

What is claimed is:

1. A pipeline ballast for a longitudinally-extending pipeline comprising:
    a first pair of side sacks being flexibly connected longitudinally therebetween and having a top and a bottom;
    a second pair of side sacks being flexibly connected longitudinally therebetween and having a top and a bottom;
    aggregate ballast material for filling the first and second pair of side sacks, the filled first and second pairs of side sacks being deformable;
    a flexible connector extending between the top of the first pair of side sacks and the top of the second pair of side sacks and adapted to extend over a top of the pipeline with first and second pairs of side sacks adapted to straddle the pipeline; and
    one or more circumferential cinches adapted for extending about the first and second pairs of side sacks for compressing the first and second pairs of side sacks radially inwardly to the pipeline.

2. The pipeline ballast of claim 1 further comprising a middle sack filled with the aggregate ballast material and wherein the middle sack forms the flexible connector between the first and second pairs of side sacks.

3. The pipeline ballast of claim 2 wherein the middle, first pair of side sacks and the second pair of side sacks are manufactured of permeable material.

4. The pipeline ballast of claim 2 wherein the middle, first pair of side sacks and the second pair of side sacks further comprise:
    an overlying layer of a geotextile;
    an underlying layer of a geotextile, the overlying and underlying layers being joined at first and second lateral and longitudinally extending peripheries for forming bottom edges of the first and second side sacks respectively and being joined at a first closed end; and
    a plurality of substantially linear and substantially parallel longitudinal seams which are spaced between the first and second lateral peripheries, the seams joining the overlying and underlying layers together and forming at the first paid of side sacks, the middle sack and the second pair of side sacks.

5. The pipeline ballast of claim 3 wherein the aggregate is an inert ballast material having a density greater than that of sand or gravel.

6. The pipeline ballast of claim 5 wherein the aggregate is barite.

7. The pipeline ballast of claim 1 wherein the aggregate is an inert ballast material having a density greater than that of sand or gravel.

8. The pipeline ballast of claim 1 wherein each of the one or more circumferential cinches is a unitary strap comprising:
    first and second lifting loops;
    a tension portion extending between the first and second lifting loops and having a length sufficient to extend about more than a circumference of the pipeline ballast when cinched to the pipeline with the first and second loops positioned substantially adjacent the side sacks;
    first and second loose ends connected to either end of the tension strap portion and having a length sufficient to overlap when the pipeline ballast is cinched to the pipeline; and cooperating hook and loop fasteners fit to the overlapping first and second loose ends to secure the tension strap portion when cinched.

9. The pipeline ballast of claim 8 wherein the tension portion has a length sufficient to position the lifting loops at about the bottom of the first and second pairs of side sacks.

10. The pipeline ballast of claim 8 wherein the tension portion has a length of about 1.25 to about 1.5 times the circumference of the pipeline ballast when cinched to the pipeline.

11. A method for strapping pipeline ballast to a longitudinally extending pipeline comprising:
    providing at least two ballast sacks adapted for straddling the pipeline and being flexibly connected over a top of the pipeline;
    providing one or more circumferential cinches for spacing longitudinally along the ballast sacks, each having a tension strap portion, first and second lifting loops spaced apart at ends of the tension strap portion, and loose ends extending from either end of the tension strap portion;
    wrapping each tension strap portion more than a circumference about the pipeline ballast;
    positioning the first and second lifting loops of each cinch at about opposing sides of the pipeline;
    lifting the lifting loops of each cinch to pull them tangentially away from each other to tighten the tension strap portion about the ballast sacks, compressing the ballast sacks radially inwardly to the pipeline; and
    securing the loose ends of each cinch together so as to retain tension in the tension strap portion.

12. The method of claim 11 further comprising securing the loose ends of each cinch by overlapping and mating cooperating hook and loop fasteners.

13. The method of claim 12 wherein the lifting of the lifting loops further comprises:
    temporarily connecting a lifting device to the first and second lifting loops;
    applying tension with the lifting device and substantially equally to each of the first and second lifting loops;
    maintaining tension on each of the first and second lifting loops; and
    securing the loose ends to each other.

14. The method of claim 11 wherein there are two or more circumferential cinches and wherein the lifting of the lifting loops further comprises:
    providing a spreader bar having lift points corresponding to the number of circumferential cinches;
    temporarily connecting a lifting device between each lift point and the first and second lifting loops of each cinch;
    applying tension with the lifting device and substantially equally to each of the first and second lifting loops of each cinch;
    maintaining tension on each of the first and second lifting loops for each cinch; and
    securing the loose ends to each other.

15. The method of claim 11 wherein the positioning of the first and second lifting loops of each cinch further comprises positioning the first and second lifting loops at about a bottom of the ballast sacks.

16. A strap for cinching ballast about a pipeline comprising:
    a circumferential and continuous cinching strap having first and second lifting loops;
    a tension portion extending between the first and second lifting loops and having a length sufficient to wrap about 1.5 times a circumference of the ballast when cinched about the pipeline;
    first and second loose ends connected to either end of the tension portion and having a length sufficient to overlap when the ballast is cinched about the pipeline; and
    cooperating fasteners fit to the overlapping first and second loose ends to secure the tension portion when cinched.

17. The strap of claim 16 wherein the cooperating fasteners are hook and loop fasteners.

18. The strap of claim 16 wherein each of the first and second lifting loops are formed by folding the tension strap portion and joining the folds.

19. The strap of claim 16 wherein:
    each of the first and second loose end has opposing surfaces; and
    one of the first or second loose end has a hook fastener on one surface and the other second or first loose end has a loop fastener on the opposing surface.

20. The strap of claim 19 wherein the first or second loose end with the loop fastener on one surface has a hook fastener on its opposing surface and the other second or first loose end also has a hook fastener on the opposing surface.

21. A low volume pipeline ballast for securing to a longitudinally extending pipeline comprising:
    at least two sacks manufactured of permeable materials, the at least two sacks further comprising:
    a first pair of side sacks being flexibly connected longitudinally therebetween and having a top and a bottom; and
    a second pair of side sacks being flexibly connected longitudinally therebetween and having a top and a bottom;
    a flexible connector between the at least two sacks and adapted to extend over a top of the pipeline with the at least first and second pairs of side sacks adapted to straddle the pipeline;
    an inert aggregate ballast material within the sacks, the ballast material having a density greater than that of sand or gravel; and
    one or more straps for compressing the sacks radially inwardly to the pipeline.

22. The low volume pipeline ballast of claim 21 wherein the at least two sacks further comprises a middle sack wherein the middle sack forms the flexible connector between the first and second pairs of side sacks.

23. The low volume pipeline ballast of claim 22 wherein the middle, first pair of side sacks and the second pair of side sacks further comprise:
    an overlying layer of a geotextile;
    an underlying layer of a geotextile, the overlying and underlying layers being joined at first and second lateral and longitudinally extending peripheries for forming bottom edges of the first and second pair of side sacks respectively and being joined at a first closed end; and
    a plurality of substantially linear and substantially parallel longitudinal seams which are spaced between the first and second lateral peripheries, the seams joining the overlying and underlying layers together and forming at the first pair of side sacks, the middle sack and the second pair of side sacks.

24. The low volume pipeline ballast of claim 21 wherein the aggregate is barite.

* * * * *